US009037914B1

(12) United States Patent
Au et al.

(10) Patent No.: US 9,037,914 B1
(45) Date of Patent: May 19, 2015

(54) ERROR HANDLING FOR WIDGETS

(75) Inventors: Carolyn F. Au, Mountain View, CA (US); Venkat Venugopalan, Mountain View, CA (US); Ryoji Watanabe, Cupertino, CA (US)

(73) Assignee: Google Inc., Mountain View, CA (US)

( * ) Notice: Subject to any disclaimer, the term of this patent is extended or adjusted under 35 U.S.C. 154(b) by 368 days.

(21) Appl. No.: 13/536,969

(22) Filed: Jun. 28, 2012

(51) Int. Cl.
*G06F 11/00* (2006.01)
*G06F 11/07* (2006.01)

(52) U.S. Cl.
CPC .................................. *G06F 11/079* (2013.01)

(58) Field of Classification Search
None
See application file for complete search history.

(56) References Cited

U.S. PATENT DOCUMENTS

| | | | |
|---|---|---|---|
| 6,594,774 B1* | 7/2003 | Chapman et al. | 714/2 |
| 2004/0078686 A1* | 4/2004 | Toyooka et al. | 714/38 |
| 2004/0153823 A1* | 8/2004 | Ansari | 714/38 |
| 2004/0225668 A1* | 11/2004 | Teegan et al. | 707/100 |
| 2005/0198298 A1* | 9/2005 | Nishikawa et al. | 709/226 |
| 2007/0061724 A1* | 3/2007 | Slothouber et al. | 715/716 |
| 2009/0106840 A1* | 4/2009 | Dreymann et al. | 726/23 |
| 2009/0235149 A1* | 9/2009 | Frohwein | 715/205 |
| 2011/0154095 A1* | 6/2011 | Maalempati et al. | 714/2 |

* cited by examiner

*Primary Examiner* — Gabriel Chu
(74) *Attorney, Agent, or Firm* — Patent Law Works LLP

(57) ABSTRACT

A system and method for error handling associated with a widget are disclosed. The system comprises a registration module, a communication interface, a command module, a manager monitoring module and an error detection engine. These entities are communicatively coupled to each other. The registration module registers a widget to be hosted on the host page. The host page is presented on a user device. The communication interface receives a notification indicating that the widget is ready to be displayed on the host page and sends the notification to the manager monitoring module. The manager monitoring module instructs the command module to generate a command to display the widget. The command is sent to the user device for displaying the widget. The manager monitoring module monitors the displayed widget. The error detection engine detects an error associated with the widget and performs an error correction procedure to the widget.

20 Claims, 12 Drawing Sheets

ERROR HANDLING FOR WIDGETS

The specification relates to a system and method for error handling associated with a widget hosted on a host page. In particular, the specification relates to monitoring a widget hosted on a host page and performing an error correction procedure if an error is detected.

BACKGROUND

The usage of widgets on web pages provides publishers with a convenient and efficient way to incorporate additional features into the web pages. For example, a publisher can easily include a weather notification on a web page by embedding a weather widget on the web page. Because a widget may be included in numerous different web pages and each web page may includes hundreds of different widgets, it is very difficult to monitor each widget hosted on a tremendous number of web pages and to prevent any widget misbehavior and unintended interactions between the web pages and the widget.

The widget misbehavior may cause many severe problems. For example, the widget misbehavior may cause a catastrophic self-denial-of-servicing (self-DoSing) behavior leading to a complete service outage. The widget misbehavior may also cause other problems such as stealing keyboard focus from the web page hosting the widget, leaking code errors to interrupt application in the web page, frame busting causing infinite redirections of the web page or the widget, excessive error reports, inappropriately displaying the widget even when the widget is inactive, triggering excessive client-side connections that slow down the web page, triggering new pop-up windows and leaking global symbols to the web page, etc.

It is expensive and time consuming to monitor and detect every widget misbehavior because of the large quantity of widgets used in numerous web pages. Therefore, it is desirable to establish a framework that automatically prevents widget misbehavior, detects errors associated with widgets and minimizes problems incurred by misbehaving widgets.

SUMMARY

In some examples the specification describes a system and method for error handling associated with a widget hosted on a host page. In one embodiment, the system comprises a communication interface, a registration module, a command module, a manager monitoring module and an error detection engine. These entities are communicatively coupled to each other. The communication interface receives a registration signal from a user device and sends the registration signal to the registration module. The registration module registers the widget hosted on the host page. The host page is presented on the user device. The communication interface receives a notification indicating that the widget is ready to be displayed on the host page from the user device and sends the notification to the manager monitoring module. The manager monitoring module instructs the command module to generate a command to display the widget. The command module sends the command to the communication interface and the communication interface sends the command to the user device for displaying the widget.

The manager monitoring module monitors the widget displayed on the host page. In one embodiment, the communication interface receives a heartbeat signal indicating that the widget is active from the user device and sends the heartbeat signal to the manager monitoring module. In another embodiment, the manager monitoring module instructs the command module to generate a status update request for inquiring about a status of the widget. The command module sends the status update request to the communication interface and the communication interface sends the status update request to the user device. The communication interface receives a status update including status data describing the status of the widget from the user device and sends the status update to the manager monitoring module.

The error detection engine detects an error associated with the widget. In one embodiment, the error detection engine detects the error based at least in part on the status data describing the status of the widget. The error detection engine performs an error correction procedure to the widget responsive to detecting the error. The error correction procedure includes one of closing the widget, disabling the widget, deactivating the widget and notifying a user of the error.

In one embodiment, the manager monitoring module monitors loading of the widget on the host page. The error detection engine detects a loading error if the widget fails to load on the host page.

In one embodiment, the system further comprises a code analysis module. The code analysis module analyzes program code associated with the widget and detects a harmful code pattern in the program code.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Overview

The specification describes systems and methods for handling errors associated with a widget using a widget manager. In one embodiment, the widget manager includes a registration module, an error detection engine and a command engine. The registration module registers the widget. The error detection engine detects errors associated with the widget. For example, the widget could frame busting, infinite redirects, self-DoS, uncaught JavaScript errors and stealing focus from the host page. If an error is detected, the error detection engine performs an error correction procedure. For example, the error detection engine instructs the command engine to generate a disable command to disable the error.

In some embodiments the widget manager also includes a code analysis module, a testing engine and a manager switch. The code analysis module analyzes the program code offline and identifies harmful code. The testing engine integrates a widget into a host page and tests the functionality of the widget. The manager switch identifies long-lived web applications and prevents new sessions from creating a widget hosted on a host page for long-lived web applications. This is referred to as a kill switch and it helps to avoid a system-wide crash of the host page.

Example Systems

Figure 1:
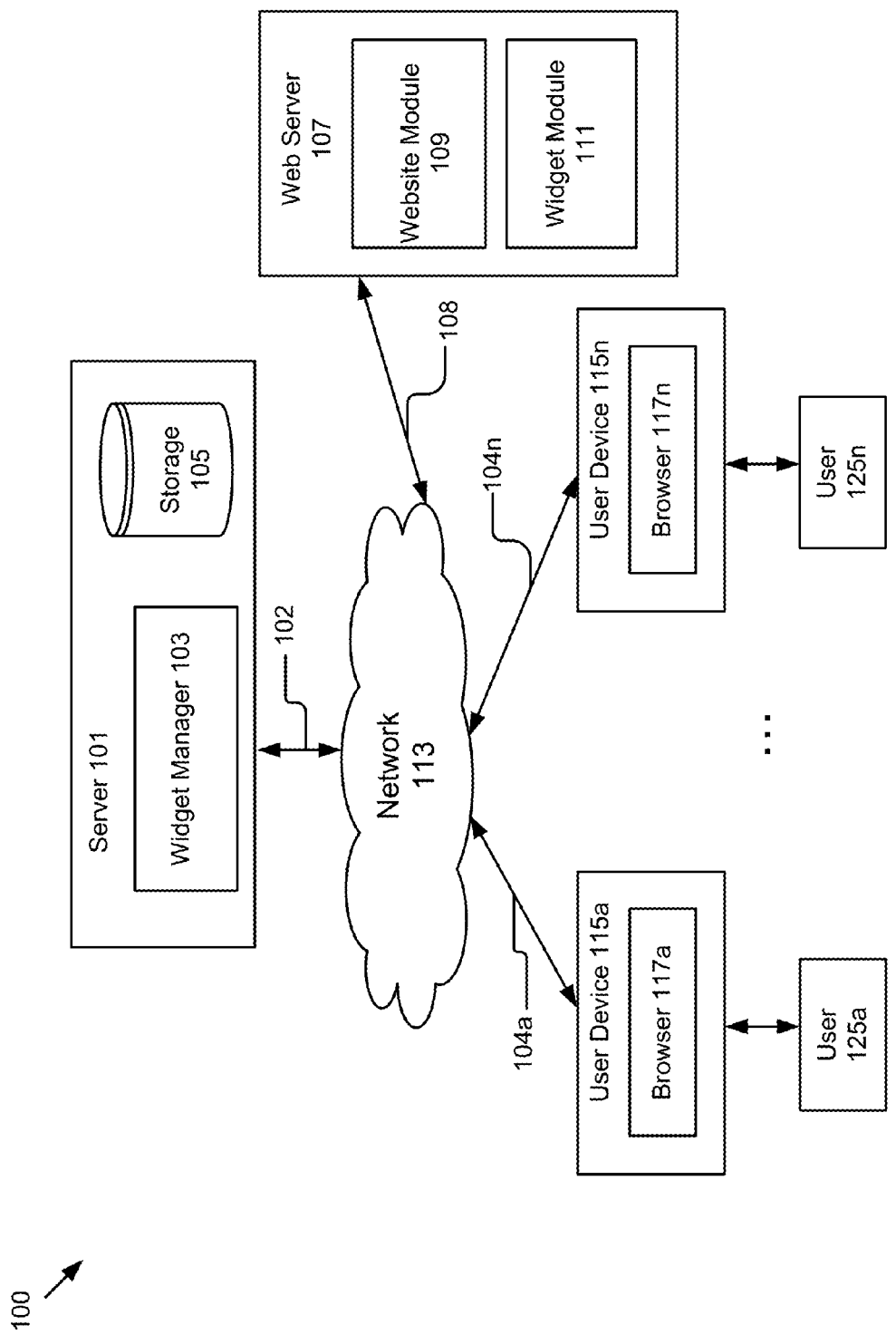
FIG. 1 is a high-level block diagram illustrating one embodiment of a system for error handling associated with a widget.

FIG. 1 illustrates a block diagram of a system 100 for error handling associated with a widget hosted on a host page according to some examples. The illustrated system 100 for error handling includes user devices 115a . . . 115n that are accessed by users 125a . . . 125n, a control server 101 and a web server 107. In FIG. 1 and the remaining figures, a letter after a reference number, such as "115a" is a reference to the element having that particular reference number. A reference number in the text without a following letter, such as "115," is a general reference to any or all instances of the element bearing that reference number. In the illustrated embodiment, these entities of the system 100 are communicatively coupled via a network 113.

The user devices 115a . . . 115n in FIG. 1 are used by way of example. While FIG. 1 illustrates two devices, the embodiment applies to any system architecture having one or more user devices. Furthermore, while only one network 113 is coupled to the user devices 115a . . . 115n, the control server 101 and the web server 107, in practice any number of networks 113 can be connected to the entities.

The control server 101 is a hardware server device. In one embodiment, the control server 101 sends and receives data to and from one or more of the user devices 115a . . . 115n via the network 113. For example, the control server 101 is a hardware server that communicates with the user devices 115a . . . 115n to monitor a widget that is hosted on a host page presented by a browser 117 of the user devices 115a . . . 115n. In one embodiment, the control server 101 receives real-time streaming context from the user devices 115a . . . 115n and monitors the widget hosted on the host page in real time. A person having ordinary skill in the art will recognize that the control server 101 can be configured to provide different services and/or functionality to the user devices 115a . . . 115n.

The control server 101 is communicatively coupled to the network 113 via signal line 102. In one embodiment, the control server 101 comprises, among other things, a widget manager 103 and a storage device 105. In another embodiment, the control server 101 additionally comprises other components conventional to a hardware server device such as a processor, a memory, an input device, a display device, etc. Persons of ordinary skill in the art will recognize that there could be multiple control servers 101 that are used for distributed computing or because different levels of responsibility performed by the widget manager 103 are performed by different control servers 101.

The widget manager 103 is code and routines for managing a widget hosted on a host page. For example, the widget manager 103 manages loading and displaying of a widget on a host page. In one embodiment, the widget manager 103 provides automatic protection for a widget hosted on a host page to prevent any misbehavior of the widget and any unintended interaction between the host page and the widget. For example, the widget manager 103 includes instructions that when executed by a processor prevent occurrence of one or more errors associated with the widget as described below. In some embodiments, portions of the widget manager 103 are executed by JavaScript that is transmitted to the browser 117 on the user device 115.

A host page is a web page hosting one or more widgets. For example, a host page is a web page from a website provided by the web server 107. In one embodiment, the host page is a web page from a website provided by the same entity that manages the control server 101. In another embodiment, a host page is a web page from a website provided by a third-party entity. The widget can be transmitted from a server that is different from the server that generates the rest of the web page content.

In one embodiment, a widget is hosted on the host page using an inline frame (referred to as "an iframed widget"). Examples of an iframed widget include, but are not limited to, a toolbar widget, a notification widget and a sharebox widget. An inline frame (referred to as "an iframe") is a frame for referencing content not stored on the web server 107. For example, an inline frame is a frame embedding a HyperText Markup Language ("HTML") document into a webpage displayed by the web server 107. In another embodiment, a widget is hosted on the host page without using an inline frame (referred to as "a non-iframed widget"). For example, the widget is directly embedded into the context of the host page without using an iframe. In one embodiment, a widget (e.g., an iframed widget or a non-iframed widget) is implemented using JavaScript.

Examples of an error associated with a widget include, but are not limited to, any self-DoSing behavior that might lead to a service outage, infinite redirections of the host page, infinite redirections of an iframe for the widget, frame busting, any uncaught code error that affects functionality of the host page and any focus stealing behavior (e.g., an iframe of a widget stealing keyboard focus from the host page), etc. One skilled in the art will recognize that other examples of errors are possible.

In one embodiment, the widget manager 103 prevents the error of self-DoSing by adding jitter to preloaded iframes and/or applying a widget library 301. The widget library 301 is described below with reference to FIG. 3. In another embodiment, the widget manager 103 prevents and/or detects the host page from activating infinite redirections and frame busting by analyzing program code associated with the widget (e.g., detecting any harmful code pattern in the program code), catching loading failures of the host page and/or applying the widget library 301. The analysis of the program code is described below in more detail with reference to a code analysis module 211 shown in FIG. 2B. In yet another embodiment, the widget manager 103 prevents and/or detects uncaught code errors that affect functionality of the host page by analyzing program code associated with the widget.

In one embodiment, the widget manager 103 prevents and/or detects the error of focusing stealing from the host page by performing one or more tests associated with the widget in a frontend. The one or more tests are described below in more detail with reference to a test engine 213 shown in FIG. 2B. In another embodiment, the widget manager 103 implements a backup bar as a backup for the widget manager 103 to perform the functionality described herein. In yet another embodiment, the widget manager 103 provides other functionality that improves the debugging ability of the widget. For example, the widget manager 103 includes test code for exposing sensitive debugging parameters and triggering errors to appear instead of being suppressed when performing a test.

In one embodiment, the widget manager 103 monitors a widget displayed on a host page and performs an error correction procedure responsive to detecting an error associated with the widget. An error correction procedure is an action performed by the widget manager 103 in response to detecting an error associated with a widget. For example, an error correction procedure is one of closing a widget, disabling a widget, deactivating a widget and notifying a user that a widget is in error, etc. On skilled in the art will recognize that other error correction procedures are possible. The widget manager 103 is described in more detail below with reference to FIG. 2B.

The storage 105 may be a non-volatile memory device or similar persistent storage media for storing instructions and/or data for managing a widget hosted on a host page. For example, the storage 105 stores error data describing one or more errors associated with a widget. In one embodiment, the storage 105 stores a widget library for providing the functionality described herein. The storage 105 is communicatively coupled to the widget manager 103. The storage 105 is described in more detail below with reference to FIG. 3.

The web server 107 may be a hardware server device. For example, the web server 107 is a hardware server operated by a third-party entity. The web server 107 is communicatively coupled to the network 113 via signal line 108. The web server 107 includes instructions and/or data for generating a website and providing one or more web pages from the website to a user. For example, the web server 107 communicates content of a web page to a browser 117 launched on a user device 115 via the network 113, causing the browser 117 to present the web page to a user operating on the user device 115. While only one web server 107 is shown, the system 100 could include one or more web servers 107.

In one embodiment, the web server 107 comprises, among other things, a website module 109 and a widget module 111. In another embodiment, the web server 107 additionally comprises other components conventional to a hardware server device such as a processor, a memory, an input device, a display device, etc.

The website module 109 is code and routines that, when executed by a processor (not pictured), generates a website (not pictured) that is hosted by the web server 107. For example, the web server 107 hosts a website generated based on the website module 109, and the website is accessed by the browser 117 operating on the user device 115 via the network 113. In one embodiment, the browser 117 accesses the website using hypertext transfer protocol (HTTP) requests and retrieves content for one or more web pages from the website. The website module 109 is stored on a non-transitory memory associated with the web server 107. In one embodiment, the website is registered with the control server 101 and the control server 101 provides the website with access to different widget services. For example, the website is registered with the control server 101 so that a web page from the website is authorized to host a notification widget provided by the control server 101 on the web page.

The widget module 111 is code and routines for incorporating a widget on a host page. For example, the widget module 111 includes one or more lines of HyperText Markup Language code ("HTML code"). In one embodiment, the widget module 111 is implemented using JavaScript code. The widget module 111 is configured to communicate with the widget manager 103 to exchange data, information and/or commands. In one embodiment, the widget module 111 is embed code embedded in the website module 109 for hosting a widget on a web page from a website generated by the website module 109. In one embodiment, the widget module 111 is retrieved by a browser 117 launched on a user device 115 and executed by a processor (not pictured) of the user device 115, causing the browser 117 to present a widget hosted on a web page to a user. The widget module 111 when executed by the processor cooperates with the widget manager 103 for managing the widget hosted on the web page presented by the browser 117. For example, the widget module 111 loads the widget on the web page and executes commands received from the widget manager 103. The widget module 111 is described in more detail below with reference to FIG. 4.

The network 113 can be a conventional type, wired or wireless, and may have any number of configurations such as a star configuration, token ring configuration or other configurations known to those skilled in the art. Furthermore, the network 113 may comprise a local area network (LAN), a wide area network (WAN) (e.g., the Internet), and/or any other interconnected data path across which multiple devices may communicate. In yet another embodiment, the network 113 may be a peer-to-peer network. The network 113 may also be coupled to or includes portions of a telecommunications network for sending data in a variety of different communication protocols. In yet another embodiment, the network 113 includes Bluetooth communication networks or a cellular communications network for sending and receiving data such as via short messaging service (SMS), multimedia messaging service (MMS), hypertext transfer protocol (HTTP), direct data connection, WAP, email, etc.

Each user device 115a . . . 115n can be a computing device, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing the network 113. One having ordinary skill in the art will recognize that other types of user devices 115a . . . 115n are possible. In one embodiment, the system 100 comprises a combination of different types of user devices 115a . . . 115n.

The user device 115a is communicatively coupled to the network 113 via signal line 104a. The users 125a . . . 125n interact with the user devices 115a . . . 115n. The user device 115a includes, among other things, a browser 117a. The user device 115n is communicatively coupled to the network 113 via signal line 104n. The user device 115a comprises, among other things, a browser 117a.

The browser 117a . . . 117n is code and routines stored in a memory of the user device 115a . . . 115n and executed by a processor of the user device 115a . . . 115n. In one embodiment, the browser 117 presents a graphical user interface (GUI) to a user and allows the user to input information via the GUI.

In one embodiment, the browser 117 retrieves content of one or more web pages from a website hosted by the web server 107 and widget content from the control server 101 and presents the one or more web pages to a user. Additionally, the browser 117 receives the widget module 111 as part of the web page from the web server 107. The browser 117 presents a widget hosted on the one or more web pages to the user when the widget module 111 is executed by a processor of the user device 115.

Figure 2A:
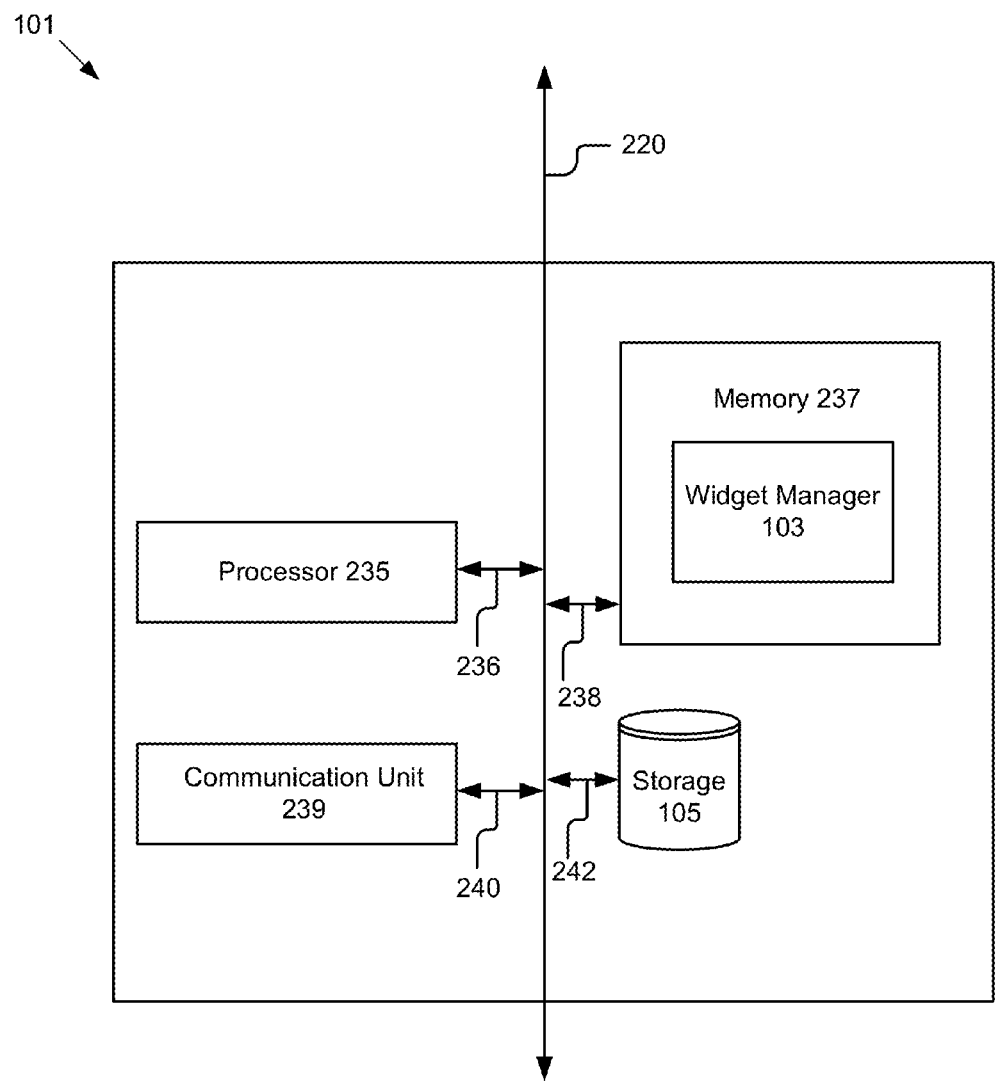
FIG. 2A is a block diagram illustrating one embodiment of hardware that stores a widget manager.

Referring now to FIG. 2A, example hardware implementing the functionality for managing widgets is described. FIG.

2A is a block diagram of a control server 101 that includes a processor 235, memory 237, storage 105, and a communication unit 239.

The processor 235 comprises some or all of an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by the processor 235. The memory 237 is coupled to the bus 220 for communication with the other components via signal line 238. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 239 receives data from the user devices 115 and the web server 107. The communication unit 239 sends the data to the widget manager 103. The communication unit 239 is coupled to the bus 220 via signal line 240. In one embodiment, the communication unit 239 includes a port for direct physical connection to the network 113 or to another communication channel. For example, the communication unit 239 includes a USB, SD, CAT-5 or similar port for wired communication with the network 113. In another embodiment, the communication unit 239 includes a wireless transceiver for exchanging data with the network 113, or with another communication channel, using one or more wireless communication methods, such as IEEE 802.11, IEEE 802.16, BLUETOOTH®, near field communication (NFC) or another suitable wireless communication method. In one embodiment, the communication unit 239 includes a NFC chip that generates a radio frequency (RF) for short-range communication.

Example Widget Managers

Figure 2B:
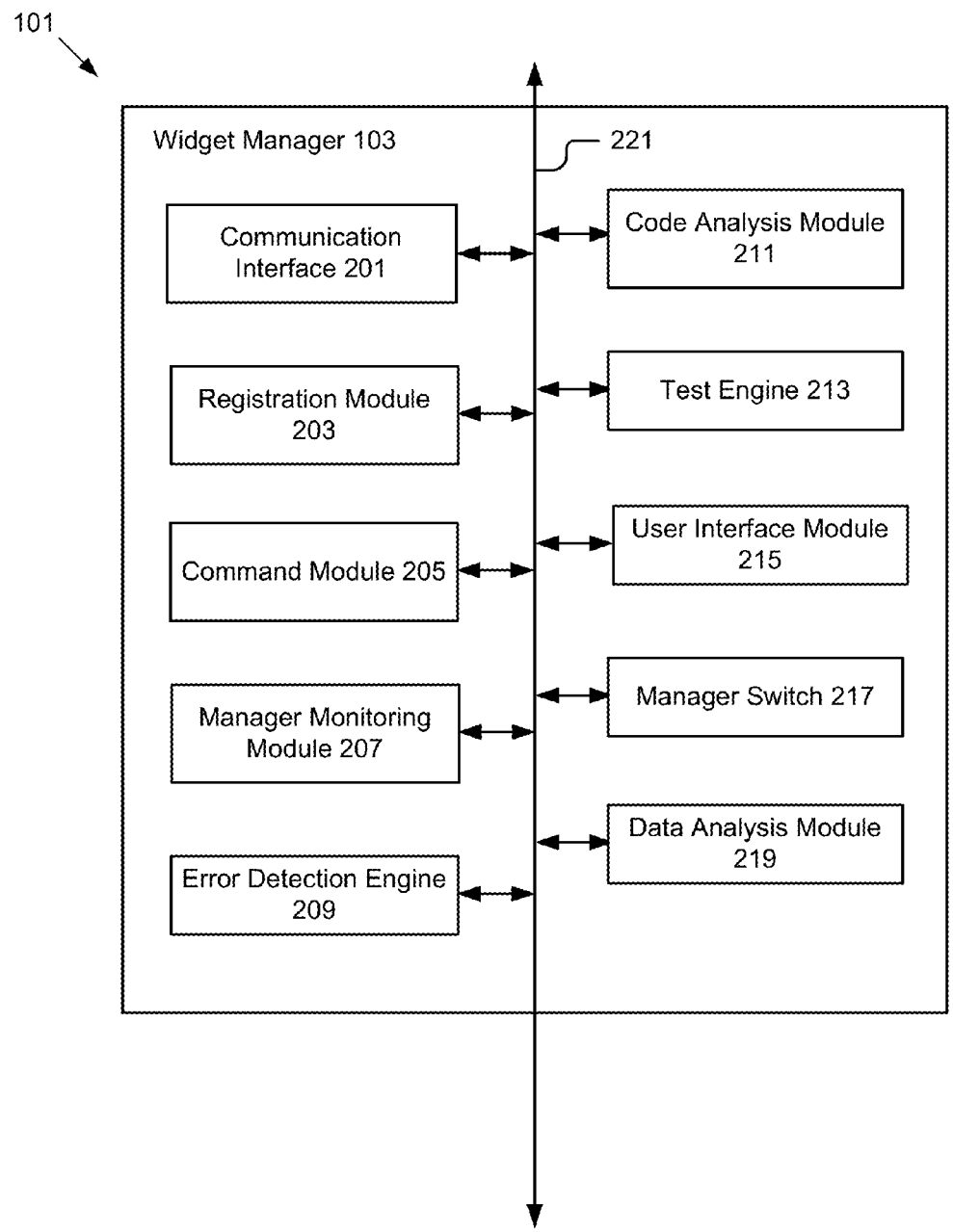
FIG. 2B is a block diagram illustrating one embodiment of the components of the widget manager.

Referring now to FIG. 2B, an example widget manager 103 is shown in more detail. In one embodiment, the widget manager 103 comprises a communication interface 201, a registration module 203, a command module 205, a manager monitoring module 207, an error detection engine 209, a code analysis module 211, a test engine 213, a user interface module 215, a manager switch 217 and a data analysis module 219 that are communicatively coupled to a software communication mechanism 221. Software communication mechanism 221 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc). The software communication can be implemented on any underlying hardware, such as a network, the Internet, a bus 220, a combination thereof, etc.

In some embodiments, some of the components illustrated as being part of the widget manager 103 are included as JavaScript that is that is executed by the browser 117 on the user device 115. Thus, in one embodiment there is a client-side widget manager 103 that is part of the JavaScript included on or loaded by the host page, which performs many of these operations and signals to the control server 101 as needed or when it has information to convey. This client-side approach is practical and scalable. Other functions, such as the tracking of the widget status are more commonly performed by the widget manager 103 on the control server 101.

The communication interface 201 includes hardware and/or software logic routines for handling communication between the communication unit 239 and other components of the widget manager 103. In one embodiment, the communication interface 201 is stored in the memory 237 of the control server 101 and is accessible and executable by the processor 235. In either embodiment, the communication interface 201 is adapted for cooperation and communication with the processor 235 and other components of the control server 101 via software communication mechanism 221.

In one embodiment, the communication interface 201 receives information and/or data from a widget module 111 when the widget module 111 is retrieved by a browser 117 of a user device 115 from the web server 107 and executed by a processor of the user device 115. The communication interface 201 sends the received information and/or data to other components of the widget manager 103. For example, the communication interface 201 receives a registration signal from an initialization module 403 of the widget module 111 and sends the registration signal to the registration module 203. In one embodiment, the communication interface 201 receives notifications from a notification module 405 of the widget module 111 and sends the notifications to the manager monitoring module 207. In another embodiment, the communication interface 201 receives a heartbeat signal and/or status updates from the widget monitoring module 407 of the widget module 111 and sends the heartbeat signal and/or status updates to the manager monitoring module 207. The initialization module 403, the notification module 405 and the widget monitoring module 407 are described in more detail below with reference to FIG. 4.

In another embodiment, the communication interface 201 receives information and/or data from other components of the widget manager 103 and sends the information and/or data to the widget module 111 retrieved by the browser 117 and executed by a processor of the user device 115. For example, the communication interface 201 receives commands from the command module 205 and sends the commands to a command execution module 411 of the widget module 111. The command execution module 411 is described in more detail below with reference to FIG. 4. In one embodiment, the communication interface 201 receives a status update request from the command module 205 and sends the status update request to the command execution module 411 of the widget module 111.

The registration module 203 includes hardware and/or software logic for registering a widget to be hosted on a host page. In one embodiment, the registration module 203 is a set of instructions executable by the processor 235 to provide the functionality described below for registering a widget. In another embodiment, the registration module 203 is stored in the memory 237 of the control server 101 and is accessible and executable by the processor 235. In either embodiment, the registration module 203 is adapted for cooperation and communication with the processor 235 and other components of the control server 101 via software communication mechanism 221.

The registration module 203 receives a registration signal from the initialization module 403 of the widget module 111 via the communication interface 201. The registration module 203 parses the registration signal and extracts one or more of an identifier of the widget, an identifier of a host page hosting the widget (e.g., a uniform resource locator ("URL") of the host page), a language used in the host page, a language used in the widget, a domain for the host page, an identifier for a browser 117 presenting the host page and a version identifier of the browser 117. The registration module 203 stores the extracted information in the storage 105.

In one embodiment, the registration module 203 registers the widget in a registration file. For example, the registration module 203 stores the identifiers of the widget and the host page in a table of the registration file so that the table includes identifiers of all the registered widgets and their host pages. In another embodiment, the registration module 203 determines whether the browser 117 for presenting the host page is compatible with the widget. For example, if a widget is configured to be presented by a Google Chrome browser only, the registration module 203 determines that the browser 117 that is an Opera browser is not compatible with the widget and the widget cannot be hosted on a web page presented using the Opera browser.

The command module 205 includes hardware and/or software logic for generating commands to manage a widget. In one embodiment, the command module 205 is a set of instructions executable by the processor 235 to provide the functionality described below for generating commands. In another embodiment, the command module 205 is stored in the memory 237 of the server 101 and is accessible and executable by the processor 235. In either embodiment, the command module 205 is adapted for cooperation and communication with the processor 235 and other components of the control server 101 via software communication mechanism 221.

In one embodiment, the command module 205 generates a "show" command for notifying the command execution module 411 of the widget module 111 to display the widget on the host page. In another embodiment, the command module 205 generates a "hide" command for notifying the command execution module 411 to hide the widget displayed on the host page. The "show" command and the "hide" command are generated alternatively so that there would not be any successive "show" commands or any successive "hide" commands for a widget. The command module 205 sends the "show" command and/or the "hide" command to the command execution module 411 via the communication interface 201.

In one embodiment, the command module 205 generates a command for requesting a status update of a widget hosted on a host page. For example, the command module 205 generates a "requestHealth" command for inquiring whether the widget is in a healthy or unhealthy state. A healthy state refers to a state that a widget hosted on a host page functions correctly. For example, a healthy state indicates that no error occurs when hosting the widget on the host page. An unhealthy state refers to a state that a widget hosted on a host page does not function correctly. For example, an unhealthy state indicates that an error associated with a widget occurs and causes malfunctioning of the widget. In one embodiment, the command module 205 generates a "requestDiagnosticString" command for requesting the widget module 111 to return a set of status variables. The set of status variables refers to status data summarizing the state of the widget. For example, the set of status variables includes an XMLHttpRequest (XHR) count (e.g., the number of HTTP or HTTPS requests sent to the server 101), an error count (e.g., the number of errors detected) and a click count (e.g., the number of times that a widget is clicked by a user). The command module 205 generates a status update request including one or more of the "requestHealth" command and the "requestDiagnosticString" command and sends the status update request to the command execution module 411.

In other embodiments, the command module 205 generates one or more other commands (e.g., a "containerActivated" command, a "containerIdle" command, an "enable" command, a "disable" command, a "close" command, etc.) and sends the one or more other commands to the command execution module 411. A "containerActivated" command allows the host page to convey its activated status to the widget module 111. A "containerIdle" command allows the host page to convey its idle status to the widget module 111. An "enable" command activates the widget on the host page. A "disable" command deactivates the widget on the host page. In one embodiment, the "disable" command acts like an "off" switch that prevents the widget from being displayed. A "close" command removes the widget from the host page in the current session of the host page. In one embodiment, the "close" command acts like an emergency "off" switch.

The manager monitoring module 207 includes hardware and/or software logic for monitoring a widget hosted on a host page. The manager monitoring module 207 cooperates with the widget monitoring module 407 to monitor activities of the widget. In one embodiment, the manager monitoring module 207 is a set of instructions executable by the processor 235 to provide the functionality described below for monitoring the widget. In another embodiment, the manager monitoring module 207 is stored in the memory 237 of the control server 101 and is accessible and executable by the processor 235. In either embodiment, the manager monitoring module 207 is adapted for cooperation and communication with the processor 235 and other components of the control server 101 via software communication mechanism 221.

In one embodiment, the manager monitoring module 207 monitors a widget hosted on a host page by receiving a heartbeat signal from the widget monitoring module 407 of the widget module 111. A heartbeat signal is a signal indicating that a widget hosted on a host page is active and responsive to management of the widget manager 103. In one embodiment, the manager monitoring module 207 receives a heartbeat signal periodically. For example, the manager monitoring module 207 receives a heartbeat signal every 30 seconds. The manager monitoring module 207 stores the heartbeat signal as a portion of status data 302 in the storage 105. The status data 302 is described below with reference to FIG. 3. In one embodiment, the manager monitoring module 207 instructs the user interface module 215 to generate graphical data for providing a user interface depicting a graph of the heartbeat signal to an administrator of the server 101. In one embodiment, the graph is a real-time graph of the heartbeat signal.

In another embodiment, the manager monitoring module 207 monitors the widget hosted on the host page by receiving status updates for the widget from the widget monitoring module 407 of the widget module 111. For example, the manager monitoring module 207 instructs the command module 205 to generate one or more commands (e.g., a "requestHealth" command, a "requestDiagnosticString" command) and send a status update request including the one or more commands to the command execution module 411 for requesting an update of the status of the widget. The command execution module 411 executes the one or more commands and instructs the widget monitoring module 407 to generate a status update including status data describing a status of the widget. The manager monitoring module 207 receives the status update including the status data from the widget monitoring module 407. In one embodiment, the manager monitoring module 207 instructs the command module 205 to generate and send the one or more commands periodically. Correspondingly, the manager monitoring module 207 receives a status update including status data periodically. The manager monitoring module 207 sends the status data to the error detection engine 209. In one embodiment, the manager monitoring module 207 instructs the user interface module 215 to generate graphical data for providing a user interface to present the status of the widget to a user (e.g. an administrator at the control server 101).

The status data includes data describing one or more of a healthy or unhealthy state of the widget and a set of status variables (e.g., an XHR count, an error count and a click count) for the widget. In one embodiment, the status data additionally includes a heartbeat signal associated with the widget. One skilled in the art will recognize that other data may be included in the status data. In one embodiment, the manager monitoring module 207 buckets the status data by an identifier of the widget and an identifier of a ping sending the status data. This is particularly advantageous because, among other things, it allows the status data to be filtered by different dimensions. In another embodiment, the manager monitoring module 207 stores the status data in an N-dimensional space. For example, the manager monitoring module 207 stores the status data in a database.

In yet another embodiment, the manager monitoring module 207 monitors the widget by receiving one or more notifications from the notification module 405 of the widget module 111. For example, the manager monitoring module 207 receives a load notification from the notification module 405 indicating that the widget is starting to be loaded on the host page. The manager monitoring module 207 monitors the loading of the widget responsive to receiving the load notification. When the widget is loaded, the manager monitoring module 207 receives a display-ready notification from the notification module 405 indicating that the widget is successfully loaded and ready to be displayed on the host page. The manager monitoring module 207 calculates a loading time for the widget. A loading time is the time that a host page takes to load a widget. In one embodiment, the loading time is the time interval between receiving the load notification and the display-ready notification.

The manager monitoring module 207 determines whether the loading time for the widget has exceeded a predetermined amount of time. If the loading time exceeds the predetermined amount of time, the manager monitoring module 207 sends a time-exceeding signal to the error detection engine 209 and the error detection engine 209 determines that an error occurs in the loading process. If the loading time does not exceed the predetermined amount of time, the manager monitoring module 207 completes monitoring the loading of the widget. Other examples of notifications received by the manager monitoring module 207 are described below with reference to FIG. 4.

In yet another embodiment, the manager monitoring module 207 cooperates with the widget monitoring module 407 of the widget module 111 to monitor user interaction with the widget. For example, the widget monitoring module 407 monitors the widget displayed on the host page and detects any user interaction (e.g., user clicks, user inputs, etc.) associated with the widget. The widget monitoring module 407 sends interaction data describing the user interaction to the manager monitoring module 207. The manager monitoring module 207 stores the interaction data in the storage 105.

The error detection engine 209 includes hardware and/or software logic for detecting warnings and errors associated with a widget hosted on a host page. In one embodiment, the error detection engine 209 is a set of instructions executable by the processor 235 to provide the functionality described below for detecting a warning and/or error associated with a widget hosted on a host page. In another embodiment, the error detection engine 209 is stored in the memory 237 of the control server 101 and is accessible and executable by the processor 235. In either embodiment, the error detection engine 209 is adapted for cooperation and communication with the processor 235 and other components of the control server 101 via software communication mechanism 221.

The error detection engine 209 receives status data describing a status of the widget from the manager monitoring module 207. In one embodiment, the error detection module retrieves the status data from the storage 105. The error detection engine 209 parses the status data and extracts one or more of a heartbeat signal, a healthy or unhealthy state of a widget and a set of status variables (e.g., an XHR count, an error count and a click count) from the status data. In one embodiment, the error detection engine 209 detects a warning based on a timeout period that occurs prior to an official error. The warning timeout causes a softer action to be taken than when an error is received and can signal something that can be fixed before an error causes the widget to be shutdown.

In one embodiment, the error detection engine 209 determines that an error occurs if a heartbeat signal is missing in the status data. In another embodiment, the error detection engine 209 determines that an error occurs if the status data includes data describing an unhealthy state of the widget. In yet another embodiment, the error detection engine 209 determines that at least one error occurs if the error count included in the status data is non-zero.

In one embodiment, the error detection engine 209 detects a loading error occurring in the loading process of the widget responsive to receiving a time-exceeding signal from the manager monitoring module 207. In another embodiment, the error detection engine 209 detects a loading error if the widget fails to load on the host page. For example, the manager monitoring module 207 receives a notification from the notification module 405 describing that the widget is unable to be loaded in the current environment and sends an error signal to the error detection engine 209. The error detection engine 209 determines a loading error occurred responsive to receiving the error signal. If the widget is unable to be loaded on the host page because of the incompatibility of the browser 117, the error detection engine 209 provides an application programming interface (API) that allows a widget to be self-disabled.

In another embodiment, the error detection engine 209 detects an error if an error notification (e.g., an "onError (message)" notification) is received from the notification module 405. The "onError(message)" notification is described below with reference to the notification module 405 shown in FIG. 4.

In yet another embodiment, the error detection engine 209 additionally includes a handler for detecting the error of infinite reloads of the host page. A handler is code and routines for preventing program bugs from causing infinite redirections of the host page. For example, a handler is an onBeforeUnload handler. The handler is installed on the host page before creating an iframe for a widget and removed from the host page when the iframe is successfully loaded on the host page (e.g., when the display-ready notification is generated by the notification module 405). In one embodiment, the error detection engine 209 determines whether the browser 117 presenting the host page is compatible with the handler. For example, the error detection engine 209 determines that an Opera browser is incompatible with the handler because the Opera browser does not support the functionality of the handler.

Error data is data associated with one or more errors. In one embodiment, the error data includes data identifying the type of errors, a brief description for each error, an identifier of the widget and status data for the widget when the errors occur, etc. In one embodiment, the error data is bucketed by an identifier of the widget and an identifier of a ping sending the data. In another embodiment, the error data is stored in an N-dimensional space. For example, the error data is stored in a database. The error detection engine 209 stores the error data in the storage 105.

The error detection engine 209 performs an error correction procedure responsive to detecting one or more errors. In one embodiment, the error detection engine 209 instructs the command module 205 to generate a "disable" command to disable the widget if at least one error is detected (e.g., a non-zero error count). In another embodiment, the error detection engine 209 instructs the command module 205 to generate a "disable" command to disable the widget if a predetermined number of errors associated with the widget have been detected. For example, the error detection engine 209 disables the widget hosted on the host page after detecting a predetermined amount of errors (e.g., 20 errors). In yet another embodiment, the error detection engine 209 instructs the command module 205 to generate a "close" command to remove the widget from the host page in the current session if an error is detected.

The code analysis module 211 includes hardware and/or software logic for analyzing program code associated with a widget. In one embodiment, the code analysis module 211 is a set of instructions executable by the processor 235 to provide the functionality described below for analyzing program code associated with a widget. In another embodiment, the code analysis module 211 is stored in the memory 237 of the control server 101 and is accessible and executable by the processor 235. In either embodiment, the code analysis module 211 is adapted for cooperation and communication with the processor 235 and other components of the control server 101 via software communication mechanism 221.

The program code associated with a widget is code for implementing a widget hosted on a web page. For example, the program code is JavaScript code for embedding a widget on a host page. In one embodiment, the program code is stored as a portion of widget code 307 in the storage 105. The widget code 307 is described below with reference to FIG. 3.

In one embodiment, the code analysis module 211 is an offline analysis tool that analyzes the program code. The code analysis module 211 retrieves the program code from the storage 105. The code analysis module 211 analyzes the program code and determines whether there is any harmful code pattern in the program code. A harmful code pattern is a piece of code that is likely to cause errors in a program. For example, a harmful code pattern includes one or more bugs in the program. In one embodiment, the code analysis module 211 maintains a list of harmful code patterns and detects any harmful code pattern in the program code based at least on the list of harmful code patterns. For example, the code analysis module 211 parses the program code and detects every code pattern in the program code that is included in the list of harmful code patterns.

In one embodiment, the code analysis module 211 instructs a code compiler (e.g., a JavaScript compiler) to output a list of unrenamed exported global variables. The list of unrenamed exported global variables is saved in the storage 105 and is used to prevent new global variables from polluting the global namespace. In another embodiment, the code analysis module 211 guards the program code using entry points. For example, the code analysis module 211 guards the program code using a code block (e.g., a try/catch code block) so that any call functions to the program code is guarded by the code block.

The test engine 213 includes hardware and/or software logic for testing a widget in a frontend. In one embodiment, the test engine 213 is a set of instructions executable by the processor 235 to provide the functionality described below for testing a widget in a frontend. In another embodiment, the test engine 213 is stored in the memory 237 of the control server 101 and is accessible and executable by the processor 235. In either embodiment, the test engine 213 is adapted for cooperation and communication with the processor 235 and other components of the control server 101 via software communication mechanism 221.

A frontend is the interface presented to a user. For example, a frontend is a host page hosting a widget in a test system. The test engine 213 performs one or more tests to integrate a widget into a frontend. The test engine 213 tests one or more of basic functionality of the widget, whether the heartbeat signal of the widget works correctly and whether a manager switch 217 and a widget switch 413 for the widget work correctly. The manager switch 217 and the widget switch 413 are described below. In one embodiment, the test engine 213 conducts the one or more tests to implement one or more test plans. The one or more test plans include one or more goals of no focus stealing from the host page to the preloaded iframe for the widget, no program code errors leaked to the host page, no frame busting, no excessive network requests made from the widget, widget not visible when preloaded on the host page and running the widget in different environments, etc.

The user interface module 215 includes hardware and/or software logic for generating graphical data for providing a user interface. In one embodiment, the user interface module 215 is a set of instructions executable by the processor 235 to provide the functionality described below for generating graphical data for providing a user interface. In another embodiment, the user interface module 215 is stored in the memory 237 of the control server 101 and is accessible and executable by the processor 235. In either embodiment, the user interface module 215 is adapted for cooperation and communication with the processor 235 and other components of the control server 101 via software communication mechanism 221.

In one embodiment, the user interface module 215 generates graphical data for depicting an image of a widget. The user interface module 215 sends the graphical data to a browser 117 on a user device 115, causing the browser 117 to generate a user interface for presenting the image of the widget to a user. A user interacts with the widget via the user interface. For example, a user clicks the widget via the user interface. In another embodiment, the user interface module 215 generates graphical data for providing a user interface to deliver a message to a user (e.g., a message notifying the user that the widget hosted on the host page is producing an error).

The browser 117 receives the graphical data and generates the user interface for presenting the message to the user.

In one embodiment, the user interface module 215 generates graphical data for providing a user interface that depicts a graph of a heartbeat signal associated with a widget. An application (e.g., a browser) launched on the control server 101 receives the graphical data from the user interface module 215 and generates the user interface for depicting the graph of the heartbeat signal to an administrator of the control server 101. In another embodiment, the user interface module 215 generates graphical data for providing a user interface that depicts the status of the widget using the status data. The application launched on the control server 101 receives the graphical data from the user interface module 215 and generates the user interface for depicting the status of the widget to the administrator of the control server 101.

The manager switch 217 includes hardware and/or software logic for preventing new sessions from creating a widget hosted on a host page. In one embodiment, the manager switch 217 is a set of instructions executable by the processor 235 to provide the functionality described below for preventing new sessions from creating a widget hosted on a host page. In another embodiment, the manager switch 217 is stored in the memory 237 of the control server 101 and is accessible and executable by the processor 235. In either embodiment, the manager switch 217 is adapted for cooperation and communication with the processor 235 and other components of the control server 101 via software communication mechanism 221.

Under the threat of long-lived web applications, the manager switch 217 prevents new sessions from creating a widget hosted on a host page. A long-lived web application is a web application that has run over a predetermined amount of time (e.g., 3 days). In one embodiment, a long-lived web application is defined by an administrator of the control server 101. In one embodiment, the manager switch 217 includes code for setting a parameter to enable or disable the creation of the widget. If the parameter is set to be "1," the manager switch 217 enables the widget. For example, the widget is set in an "on" state. If the parameter is set to be "0" or empty, the manager switch 217 disables the widget. For example, the widget is set in an "off" state. In one embodiment, the value for the parameter is stored in a configuration file. The manager switch 217 is configured based at least in part on the value for the parameter in the configuration file. In one embodiment, the configuration file includes values for parameters associated with a plurality of manager switches 217. The plurality of manager switches 217 are configured based at least in part on the values stored in the configuration file. In another embodiment, the configuration file includes values for emergency parameters that are used to configure the manager switches 217 in an event of a meltdown of the widget.

The data analysis module 219 includes hardware and/or software logic for analyzing error data associated with a widget. In one embodiment, the data analysis module 219 is a set of instructions executable by the processor 235 to provide the functionality described below for analyzing error data associated with a widget. In another embodiment, the data analysis module 219 is stored in the memory 237 of the control server 101 and is accessible and executable by the processor 235. In either embodiment, the data analysis module 219 is adapted for cooperation and communication with the processor 235 and other components of the control server 101 via software communication mechanism 221.

The data analysis module 219 retrieves error data associated with a widget from the storage 105. The data analysis module 219 analyzes the error data to generate an analysis result. For example, the data analysis module 219 employs machine learning techniques to analyze the error data and generates an analysis result that includes analytics data describing error patterns and factors incurring the errors. One skilled in the art will recognize that the analytics data may include other data. In one embodiment, the data analysis module 219 stores the analysis result in the storage 105 as a portion of analytics data 305. The analytics data 305 is described below with reference to FIG. 3. In another embodiment, the data analysis module 219 instructs the user interface engine 215 to generate graphical data for displaying the analysis result.

Example Storage Contents

Figure 3:
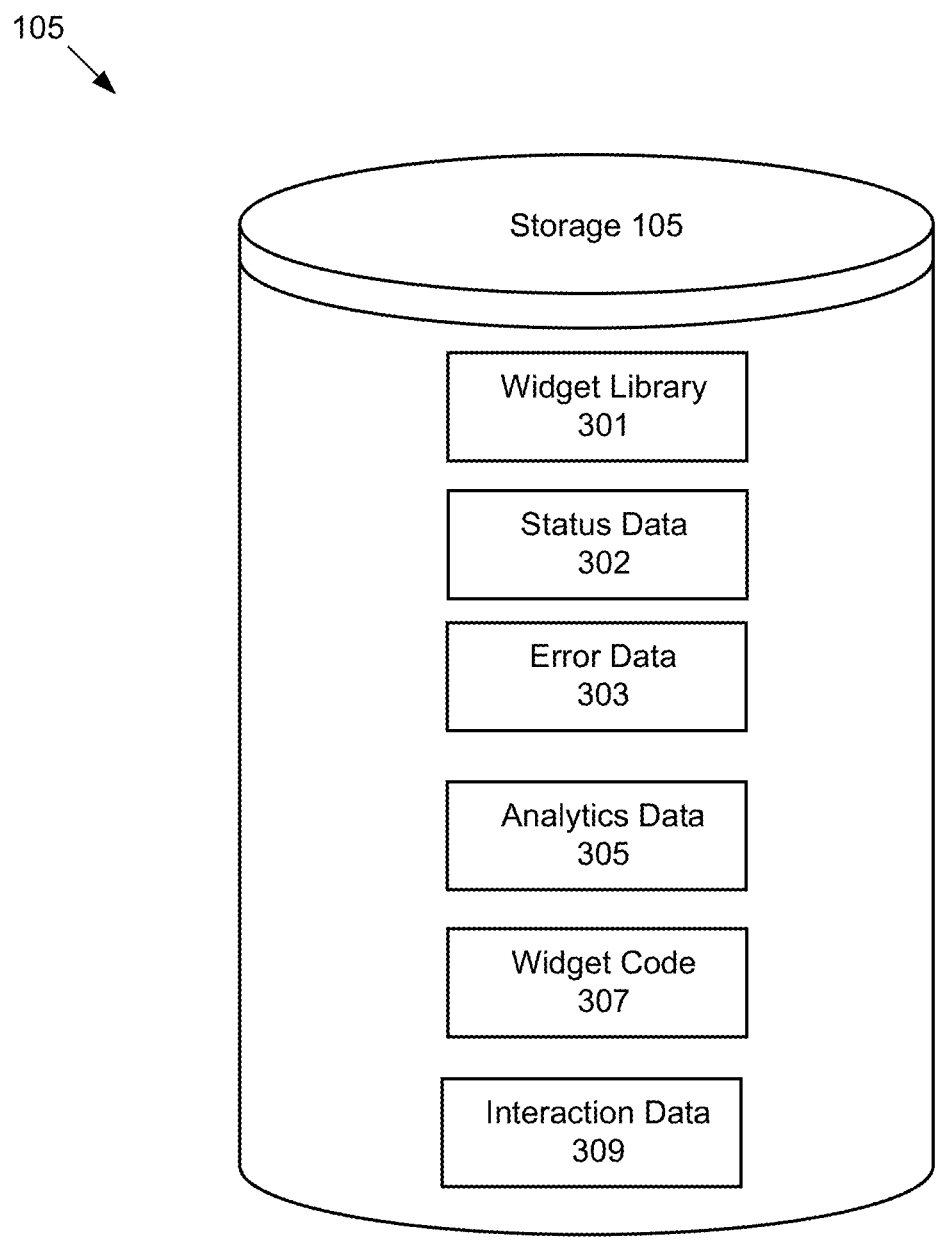
FIG. 3 is a block diagram illustrating one embodiment of a storage device.

Referring now to FIG. 3, the storage 105 is shown in more detail. FIG. 3 illustrates one embodiment of a block diagram of storage 105 that includes a widget library 301, status data 302, error data 303, analytics data 305, widget code 307 and interaction data 309.

The widget library 301 includes code and/or data for preventing and detecting errors. For example, the widget library 301 provides code for generating a heartbeat signal and a status update (e.g., a healthy or unhealthy state of the widget, a set of status variables, etc.) of the widget. In one embodiment, the widget library 301 includes code for throttling networking calls to prevent self-DoSing behaviors. In another embodiment, the widget library 301 includes code for detecting keyboard (or input) focus stealing behaviors. In yet another embodiment, the widget library 301 includes code for preventing infinite reloads of the host page and frame busting. In yet another embodiment, the widget library 301 includes code for overriding one or more functions (e.g., a window.top function) used to implement a widget hosted on a host page.

The status data 302 includes data describing states of one or more widgets. For example, the status data 302 includes data describing one or more of a heartbeat signal, a healthy or unhealthy state of a widget and a set of status variables (e.g., an XHR count, an error count and a click count) for the widget. In one embodiment, the status data 302 includes an identifier of the widget and an identifier of the host page hosting the widget.

The error data 303 includes data describing errors associated with one or more widgets. For example, the error data 303 includes one or more of data identifying the type of error, a brief description of the error, an identifier of the widget and status data for the widget when the error occurs, etc.

The analytics data 305 includes data describing one or more analysis results for the error data 303. For example, the analytics data 305 includes data describing one or more error patterns associated with the errors and one or more factors incurring the errors.

The widget code 307 includes program code for implementing a widget hosted on a host page. For example, the widget code 307 includes JavaScript code for generating an iframe for a widget and integrating the iframe into the host page. In one embodiment, the widget code 307 includes code for configuring the iframe such as setting the height, width and skin color for the iframe. One skilled in the art will recognize that the widget code 307 may include other program code associated with a widget.

The interaction data 309 is data describing user interactions with one or more widgets. For example, the interaction data 309 includes data describing a user input to a widget hosted on a host page. In one embodiment, the interaction data 309 includes data describing that a user has clicked an image for a widget shown on the host page. For example, the interaction data 309 includes data describing that a user has clicked a Hide button shown in the image to hide the widget.

Example Widget Modules

Figure 4:
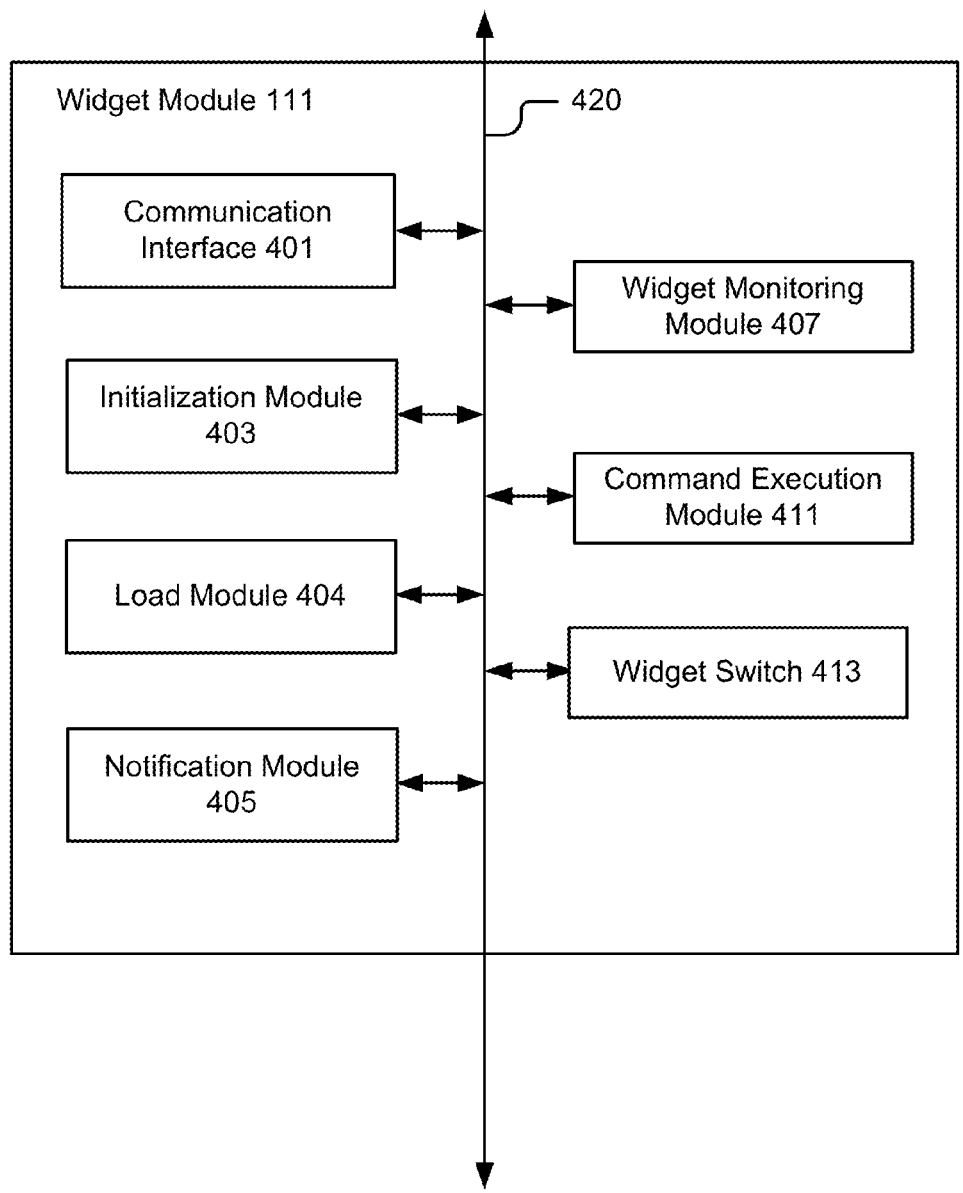
FIG. 4 is a block diagram illustrating one embodiment of a widget module.

Referring to FIG. 4, the widget module 111 is shown in more detail. FIG. 4 is a block diagram of the widget module 111 according to some examples. In one embodiment, the widget module 111 is retrieved by a browser 117 launched on a user device 115 in conjunction with content of a web page from the web server 107. The browser 117 presents the web page to a user. The widget module 111 is executed by a processor (not pictured) of the user device 115 so that a widget is generated and hosted on the web page. The widget module 111 communicates with components of the widget manager 103 to provide the functionality described herein. In one embodiment, the widget module 111 is retrieved from the web server 107 and stored in a memory (not pictured) of the user device 115.

As illustrated in FIG. 4, the widget module 111 comprises, among other things, a communication interface 401, an initialization module 403, a load module 404, a notification module 405, a widget monitoring module 407, a command execution module 411 and a widget switch 413. These components of the widget module 111 are communicatively coupled to each other via a software communication mechanism 420.

The communication interface 401 is code and routines for handling communication between other components of the widget module 111 and components of the widget manager 103. For example, the communication interface 401 receives a registration signal from the initialization module 403 and sends the registration signal to the registration module 203 via the network 113. The communication interface 401 communicates with the other components via software communication mechanism 420. In one embodiment, the communication interface 401 receives a notification from the notification module 405 and sends the notification to the manager monitoring module 207 via the network 113. In another embodiment, the communication interface 401 receives a status update from the widget monitoring module 407 and sends the status update to the manager monitoring 207 via the network 113. In yet another embodiment, the communication interface 401 receives a command from the command module 205 via the network 113 and sends the command to the command execution module 411.

The initialization module 403 is code and routines for initializing a widget to be hosted on a host page. For example, the initialization module 403 includes a piece of bootloader code that is used to initialize the widget. The initialization module 403 communicates with the other components via the software communication mechanism 420. In one embodiment, the initialization module 403 establishes a connection with the widget manager 103 in the initialization process. The initialization module 403 generates a registration signal and sends the registration signal to the registration module 203 via the communication interface 401 and the network 113. The initialization module 403 sends an initialization-complete signal to the load module 404 when the initialization process is complete.

The load module 404 is code and routines for loading a widget on a host page. For example, the load module 404 loads a widget on a host page after receiving an initialization-complete signal from the initialization module 403. The load module 404 communicates with the other components via the software communication mechanism 420. In one embodiment, the load module 404 instructs the notification module 405 to generate a load notification and send the load notification to the manager monitoring module 207 at the beginning of loading the widget. The load module 404 loads the widget. For example, the load module 404 uses an "iframe.open( )" function to open an iframe for the widget and loads content for the widget (e.g., an image for the widget) to the iframe. In one embodiment, the load module 404 configures the iframe according to a configuration setting for the iframe. For example, the load module 404 sets the height, width and skin color for the iframe based at least in part on the configuration setting.

When the widget is successfully loaded on the host page, the load module 404 instructs the notification module 405 to generate a display-ready notification and send the notification to the manager monitoring module 207. In one embodiment, the manager monitoring module 207 instructs the command module 205 to generate a show command and send the show command to the command execution module 411. The command execution module 411 instructs the load module 404 to display the widget on the host page based on the show command.

The notification module 405 is code and routines for generating notifications. For example, the notification module 405 generates a load notification and sends the load notification to the manager monitoring module 207. The load notification indicates that the widget is starting to be loaded on the host page. In one embodiment, the load notification is implemented using an "onStarting" call. The notification module 405 is communicatively coupled to the software communication mechanism 420.

In one embodiment, the notification module 405 generates a display-ready notification and sends the display-ready notification to the manager monitoring module 207. The display-ready notification indicates that the widget is successfully loaded and ready to be displayed on the host page. In one embodiment, the display-ready notification is sent to the manager monitoring module 207 in conjunction with a heartbeat signal. In another embodiment, the display-ready notification is implemented using an "onReady(version ID)" call. The version ID is a version identifier of a frontend presenting the host page hosting the widget. For example, the version ID is a version identifier of a browser that presents the host page. In one embodiment, the manager monitoring module 207 instructs the command module 205 to generate a command to disable the widget responsive to receiving a version ID that represents a browser that is incompatible with the widget.

In another embodiment, the notification module 405 generates an error notification that includes an error message responsive to receiving an error signal from the widget monitoring module 407 and sends the error notification to the manager monitoring module 207. The error notification indicates that an error associated with the widget is detected by the widget monitoring module 407 and a description of the error is included in the error message. In one embodiment, the error notification is implemented using an "onError(message)" call.

In yet another embodiment, the notification module 405 generates an informational notification and sends the informational notification to the manager monitoring module 207. The informational notification is a notification including information associated with the widget such as an identifier of the widget, an identifier of the host page, etc. In one embodiment, the informational notification is implemented using an "onInfo" call.

In other embodiments, the notification module 405 generates one or more of a hide notification, a close notification and a show notification and sends the one or more notifications to the manager monitoring module 207. The hide notification indicates that the widget is hidden on the host page responsive to a request from the widget module 111 instead of a command from the widget manager 103. In one embodiment, the hide notification is implemented using an "onHide" call. The close notification indicates that the widget is closed on the host page responsive to a request from the widget module 111 instead of a command from the widget manager 103. In one embodiment, the close notification is implemented using an "onClose" call. The show notification indicates that the widget is shown on the host page in an urgent situation responsive to a request from the widget module 111 instead of a command from the widget manager 103. In one embodiment, the show notification is implemented using an "onShow" call.

The widget monitoring module 407 is code and routines for monitoring activities of a widget on a user device 115. The widget monitoring module 407 cooperates with the manager monitoring module 207 to monitor the widget. For example, the widget monitoring module 407 monitors the loading of the widget on the host page and sends an error signal to the notification module 405 if the widget monitoring module 407 detects an error. The notification module 405 then sends an error notification to the manager monitoring module 207 responsive to receiving the error signal. In one embodiment, both of the manager monitoring module 207 and the widget monitoring module 407 are involved in monitoring the loading of the widget. In another embodiment, only the widget monitoring module 407 monitors the loading of the widget. In yet another embodiment, only the manager monitoring module 207 monitors the loading of the widget. The widget monitoring module 407 communicates with the other components via the software communication mechanism 420.

In one embodiment, the widget monitoring module 407 detects user interaction with the widget and generates interaction data describing the user interaction. For example, the widget monitoring module 407 monitors the widget displayed on the host page and detects user activities on the widget (e.g., user clicks on the widget, user input to the widget, etc.). The widget monitoring module 407 sends the interaction data to the manager monitoring module 207 to identify any problems that are detected in the interaction.

In another embodiment, the widget monitoring module 407 monitors status of the widget displayed on the host page. For example, the widget monitoring module 407 maintains a state parameter that indicates whether the widget is in a healthy or unhealthy state. If the widget monitoring module 407 detects that the widget is in an unhealthy state, the widget monitoring module 407 sets the value for the state parameter to be "0" or empty. The widget monitoring module 407 instructs the notification module 405 to send an error notification to the manager monitoring module 407. If the widget is in a healthy state, the widget monitoring module 407 sets the value for the state parameter to be "1."

In one embodiment, the widget monitoring module 407 maintains a set of counters for storing values for a set of status variables. For example, the widget monitoring module 407 uses a first counter to store a value for the XHR count, a second counter to store a value for the error count and a third counter to store a value for the user click count. The widget monitoring module 407 modifies values storing in the counters if an activity associated with the widget is detected. For example, the widget monitoring module 407 increases the value for the user click count by one if a user has clicked the widget. As another example, the widget monitoring module 407 increases the value for the error count by two if the widget monitoring module 407 detects two errors associated with the widget.

In one embodiment, the command execution module 411 receives a status update request from the command module 205 and instructs the widget monitoring module 407 to generate a status update for the widget. The widget monitoring module 407 generates the status update by including one or more of the values for the state parameter (e.g., a healthy state) and values for the counters (e.g., XHR count, error count, user click count, etc.) in the status update. In one embodiment, the status update is sent to the manager monitoring module 207 as a portion of a ping. The ping includes one or more of an identifier of the widget, an identifier of the version of the widget, a length of monitoring time the ping covers (e.g., 30,000 miliseconds), a value for the XHR count, a value for the error count, a value for the user click count and any instance of a widget that is not unhealthy. In one embodiment, the ping includes both the values for the state parameter (e.g., a healthy state) and the values for the counters (e.g., XHR count, error count, user click count, etc.). In another embodiment, the ping only includes the values for the counters. In yet another embodiment, the ping also includes a sample rate for the status of the widget. One skilled in the art will recognize that the ping may include other data. In one embodiment, the ping is sent to the widget manager 103 in the form of a HTTP or HTTPS request.

In one embodiment, the widget monitoring module 407 generates a heartbeat signal indicating that the widget is active and sends the heartbeat signal to the manager monitoring module 207. For example, the widget monitoring module 407 generates a heartbeat signal for the widget periodically if the widget is active.

The command execution module 411 is code and routines for parsing and executing commands received from the command module 205. For example, the command execution module 411 displays a widget on a host page responsive to receiving a "show" command. Similarly, the command execution module 411 hides the widget on the host page responsive to receiving a "hide" command, activates the widget responsive to receiving an "enable" command, deactivates the widget responsive to receiving a "disable" command and removing the widget from the host page responsive to receiving a "close" command. The command execution module 411 communicates with the other components via the software communication mechanism 420.

In one embodiment, the command execution module 411 receives a status update request from the command module 205 and extracts one or more commands from the status update request. If a "requestHealth" command is included the status update request, the command execution module 411 instructs the widget monitoring module 407 to generate a status update including a healthy or unhealthy state of the widget. If a "requestDiagnosticString" command is included in the status update request, the command execution module 411 instructs the widget monitoring module 407 to generate a status update including values for a set of status variables. If both the "requestHealth" command and the "requestDiagnosticString" command are included in the status update request, the command execution module 411 instructs the widget monitoring module 407 to generate a status update including a healthy or unhealthy state of the widget and values for a set of status variables. The widget monitoring module 407 sends the status update to the manager monitoring module 207.

The widget switch 413 is code and routines for disabling new network requests from long-lived sessions. A long-lived session is a session that exists over a predetermined amount of time. For example, a long-lived session is a session that exists more than 48 hours. In one embodiment, a long-lived session is defined by an administrator of the server 101. The widget switch 413 communicates with the other components via the software communication mechanism 420. In one embodiment, the widget switch 413 is configured to ignore new incoming network requests under the threat of long-lived web applications. For example, the widget switch 413 includes code for setting a parameter to enable or disable new network requests. If the parameter is set to be "1," the widget switch 413 enables new network requests. If the parameter is set to be "0" or empty, the widget switch 413 disables new network requests.

Example User Interface Modules

Figure 5:
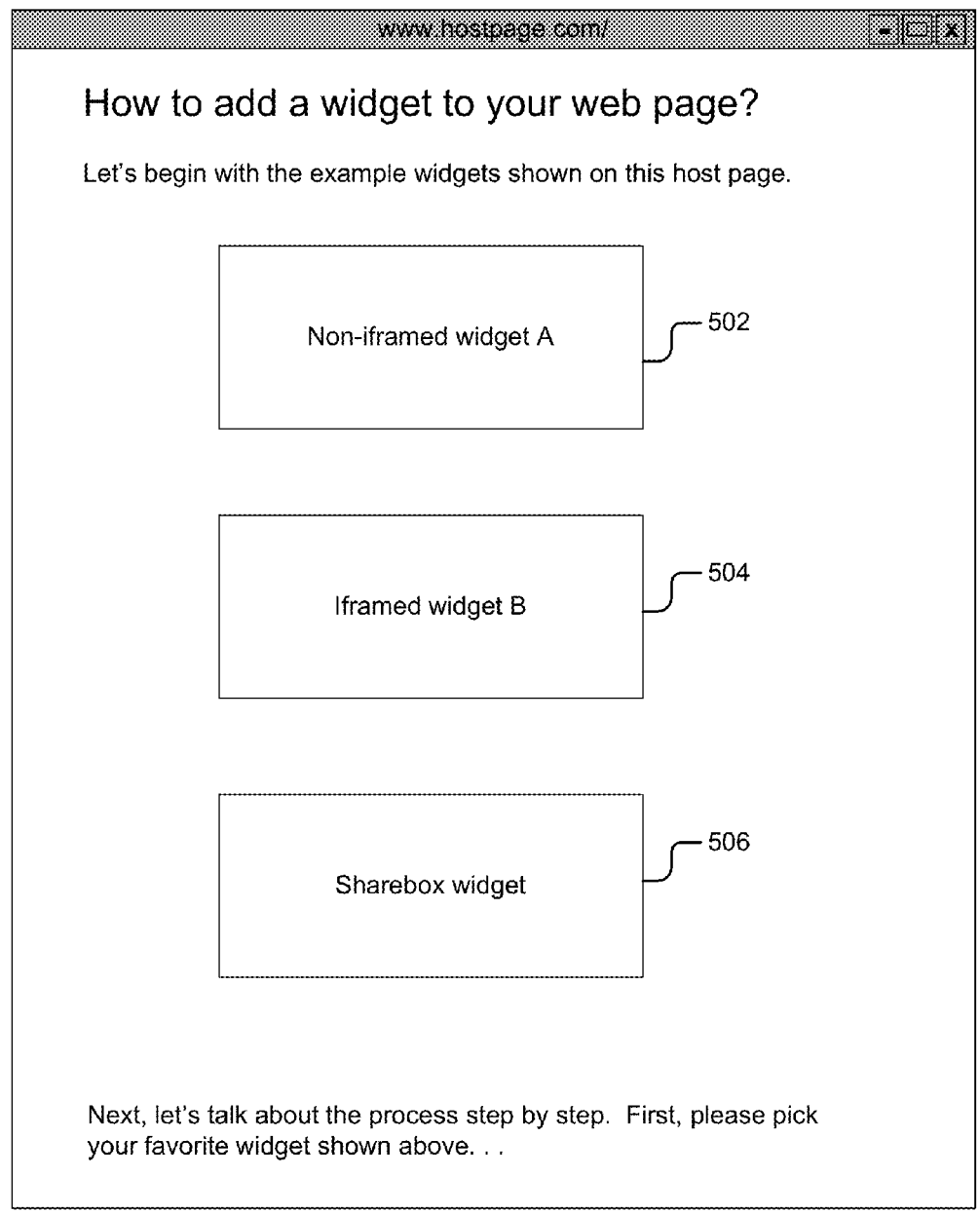
FIG. 5 is a graphic representation of one or more widgets hosted on a host page.

The creation and maintenance of a widget can be divided into initialization and running During initialization, the modules in the widget are configured and defined and the widget is registered with the registration module 203. Next, the widget runs on the host page. Turning now to the user interface module 215, FIG. 5 is a graphic representation 500 of a host page (www.hostpage.com) hosting a plurality of widgets. For example, the host page includes a non-iframed widget A 502, an iframed widget B 504 and a sharebox widget 506. In one embodiment, a widget hosted on a host page is represented by an image embedded in the host page and a user interacts with the widget by clicking on the image. In other embodiments, a user interacts with the widget by providing an input via a field or a drop-box depicted in the image.

Example Event Diagrams

Figure 6:
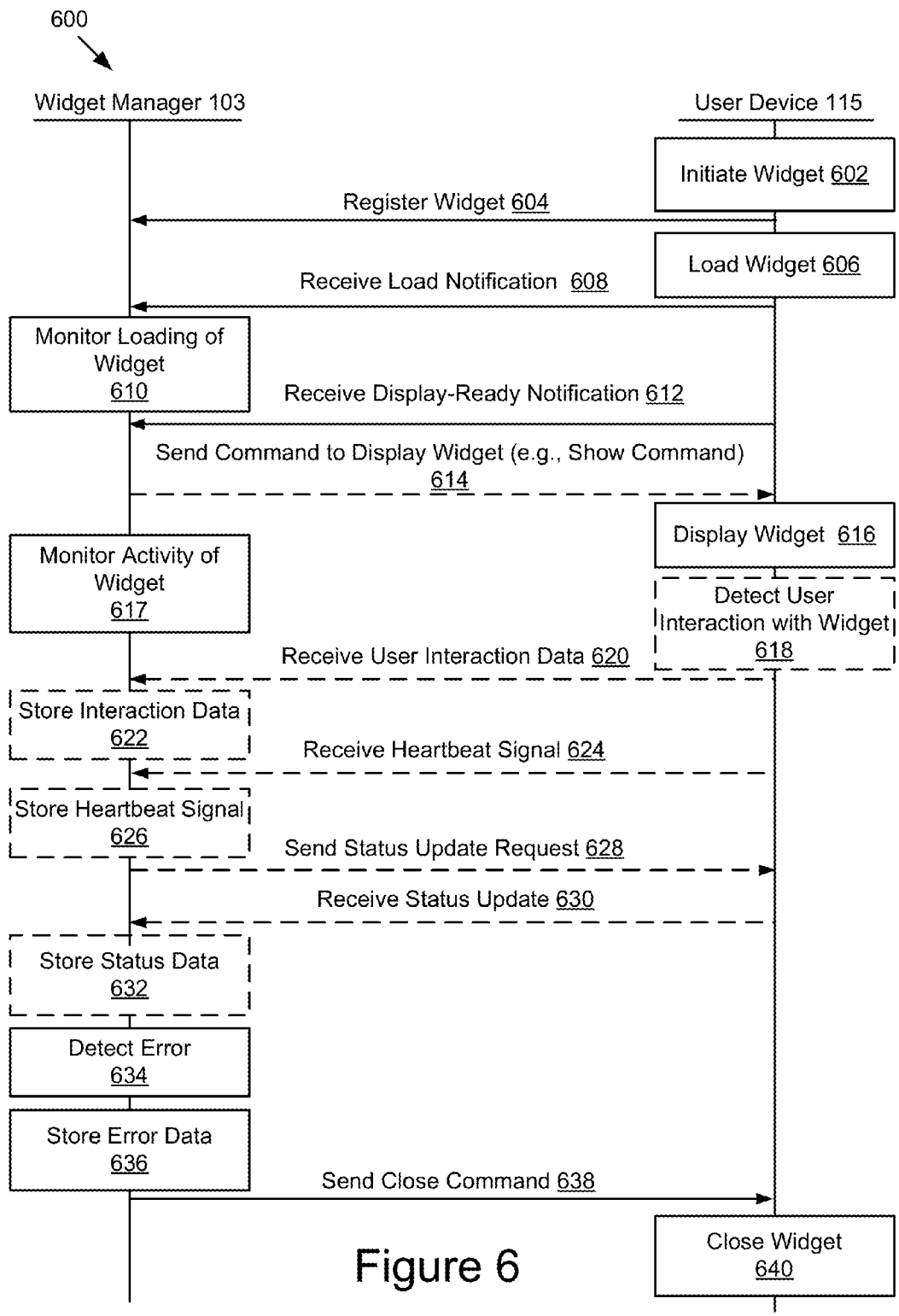
FIG. 6 is an event diagram illustrating one embodiment of a method for error handling associated with a widget.

FIG. 6 is an event diagram 600 illustrating one embodiment of a method for error handling associated with a widget. The widget module 111 packages the widget implementations into JavaScript modules. The widget module 111 is retrieved from the web server 107 by a browser 117 of a user device 115 in conjunction with content of a web page and executed by a processor of the user device 115, causing the browser 117 to present the web page (or, a host page) hosting the widget to a user. At the beginning, the initialization module 403 of the widget module 111 initializes 602 the widget. The initialization module 403 generates a registration signal and sends the registration signal to the registration module 203 of the widget manager 103 via the network 113. The registration module 203 registers 604 the widget responsive to receiving the registration signal. When the initialization process is finished, the initialization module 403 sends an initialization-complete signal to the load module 404 of the widget module 111.

Responsive to receiving the initialization-complete signal, the load module 404 starts to load 606 the widget on the host page. The load module 404 instructs the notification module 405 to generate a load notification indicating that the widget is being loaded on the host page. The manager monitoring module 207 receives 608 the load notification from the notification module 405 and begins to monitor 610 the loading of the widget. When the load module 404 has successfully loaded the widget on the host page, the load module 404 instructs the notification module 405 to generate a display-ready notification indicating that the widget is loaded and ready to display. Although the widget is loaded on the host page, the widget is not displayed to a user yet.

The manager monitoring module 207 receives 612 the display-ready notification from the notification module 405. In one embodiment, the manager monitoring module 207 instructs the command module 205 to generate a command (e.g., a "show" command) for notifying the command execution module 411 to display the widget on the host page. Optionally, the command module 205 sends 614 the command to the command execution module 411. Hereinafter, a step (e.g., step 614) is depicted using a dashed line to indicate that it is an optional feature of the method. Responsive to receiving the command, the command execution module 411 displays 616 the widget on the host page.

The manager monitoring module 207 monitors 617 any activity of the widget after the widget is displayed. In one embodiment, the manager monitoring module 207 cooperates with the widget monitoring module 407 to monitor activities associated with the widget. If the user has interacted with the widget (e.g., clicking the widget, providing an input to the widget, etc.), the widget monitoring module 407 detects 618 the user interaction with the widget. The widget monitoring module 407 generates interaction data describing the user interaction and sends the interaction data to the manager monitoring module 207.

The manager monitoring module 207 receives 620 the interaction data and stores 622 the interaction data in the storage 105. Optionally, the manger monitoring module 207 receives 624 a heartbeat signal from the widget monitoring module 407 and stores 626 the heartbeat signal as a portion of status data in the storage 105. In one embodiment, the manager monitoring module 207 receives a heartbeat signal from the widget monitoring module 407 periodically.

The manager monitoring module 207 sends 628 a status update request to the command execution module 411. The command execution module 411 extracts one or more commands from the status update request and instructs the widget monitoring module 407 to generate a status update including status data for the widget. The manager monitoring module 207 receives 630 the status update from the widget monitoring module 407. The manager monitoring module 207 extracts the status data from the status update and stores 632 the status data in the storage 105. In one embodiment, the manager monitoring module 207 sends the status data to the error detection engine 209.

The error detection engine 209 receives the status data from the manager monitoring module 207. In one embodiment, the error detection engine 209 retrieves the status data from the storage 105. The error detection engine 209 parses the status data and determines whether an error associated with the widget occurs. For example, the error detection engine 209 determines that an error occurs when the status data describes that the widget is in an unhealthy state. As another example, the error detection engine 209 determines that one or more errors occur if the value for the error count included in the status data is nonzero. If the error detection engine 209 detects 634 an error associated with the widget, the error detection engine 209 stores 636 error data describing the detected error in the storage 105. In one embodiment, the error data includes data identifying the type of error, a brief description of the error, an identifier of the widget and status data for the widget when the error occurs, etc.

The error detection engine 209 performs an error correction procedure responsive to detecting the error. In one embodiment, the error detection engine 209 performs the error correction procedure when a predetermined number of errors have been detected. For example, the error detection engine 209 performs the error correction procedure when the value for the error count exceeds a predetermined number. An error correction procedure includes one of disabling widget, closing the widget and deactivating the widget, etc. For example, the error detection engine 209 performs the error correction procedure of closing the widget by instructing the command module 205 to generate a "close" command to remove the widget from the host page. The command module 205 sends 638 the "close" command to the command execution module 411. The command execution module 411 receives the "close" command and closes 640 the widget by removing the widget from the host page.

Example Methods

Figure 7:
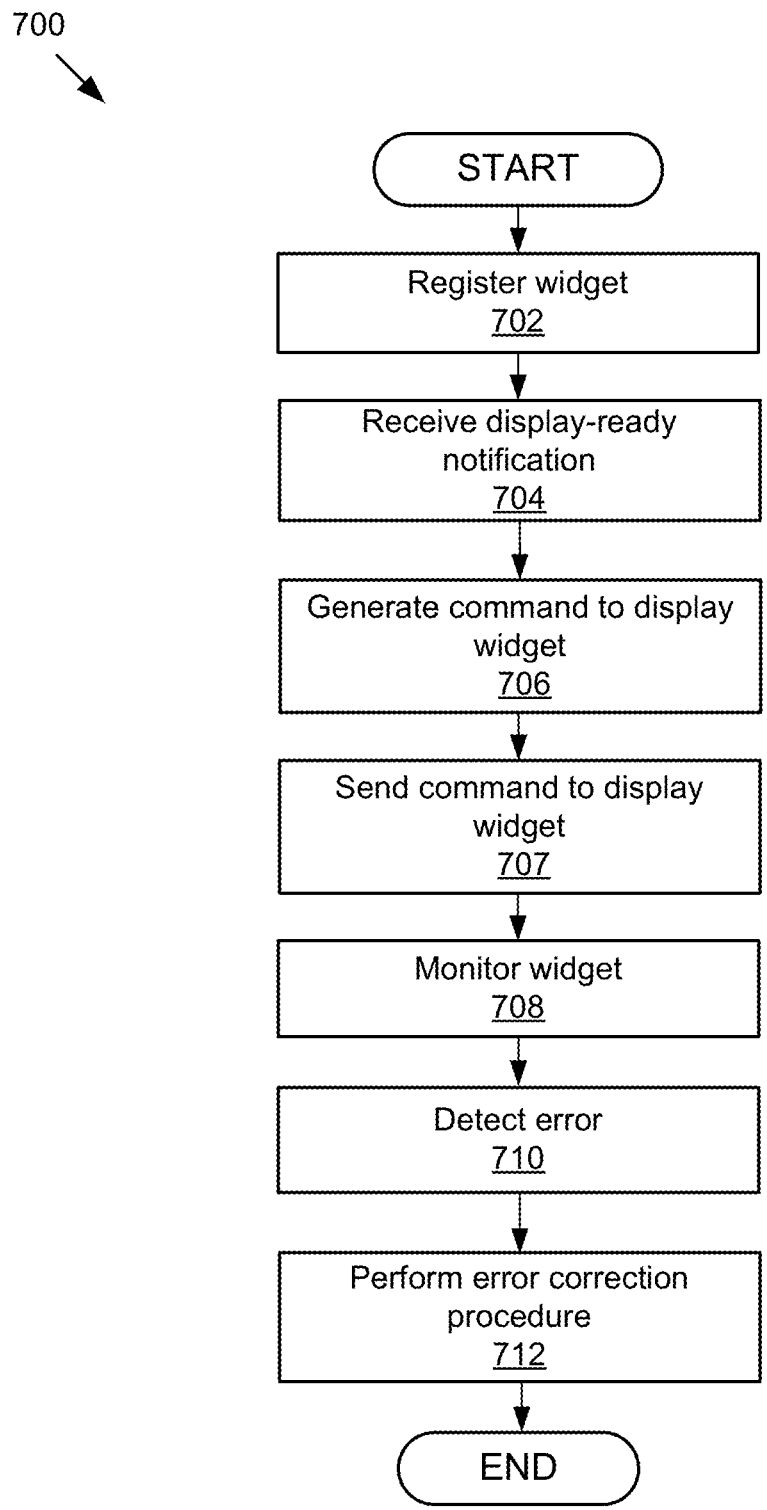
FIG. 7 is a flow diagram illustrating one embodiment of a method for error handling associated with a widget.
Figure 8A:
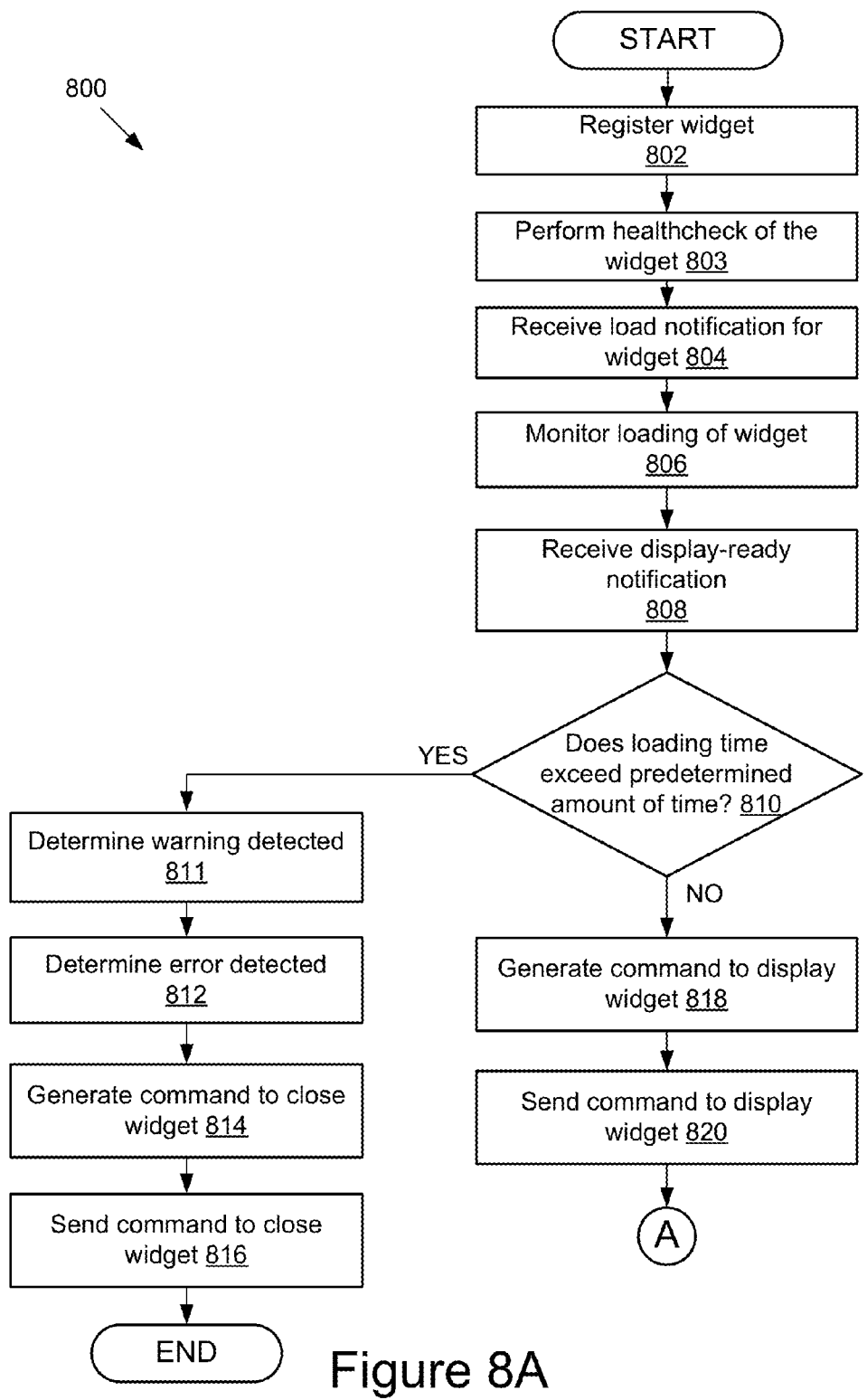
FIGS. 8A-8C are flow diagrams illustrating another embodiment of a method for error handling associated with a widget.
Figure 8B:
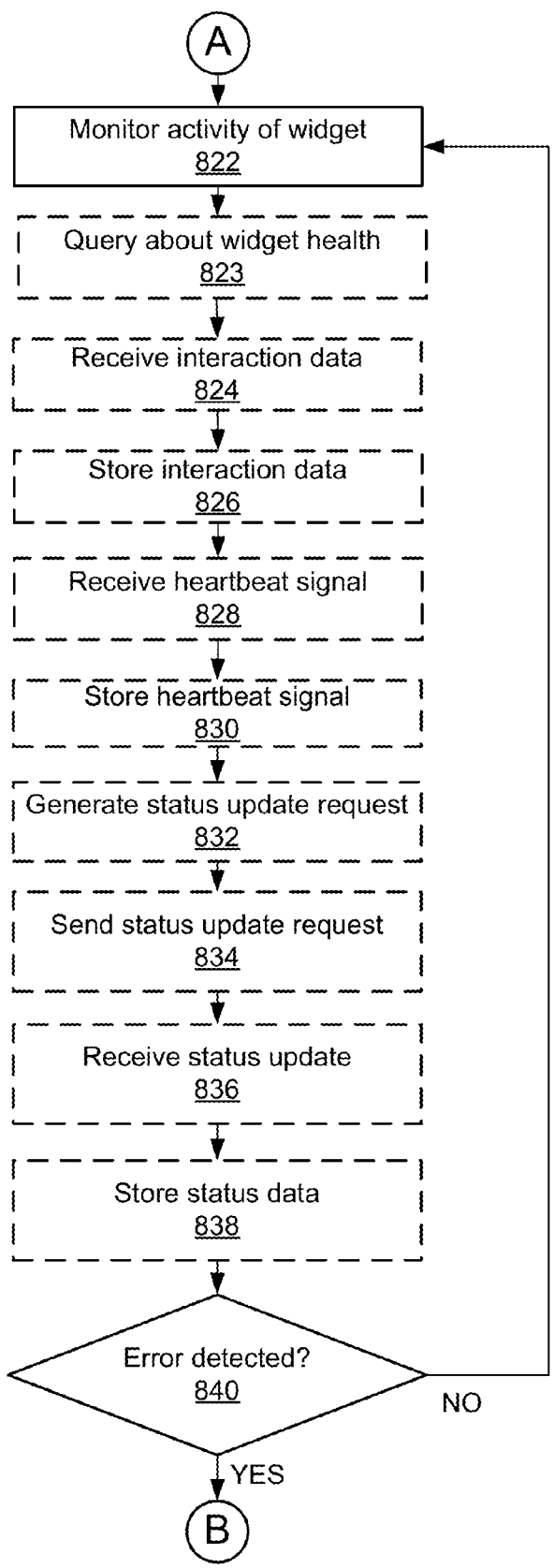
Figure 8C:
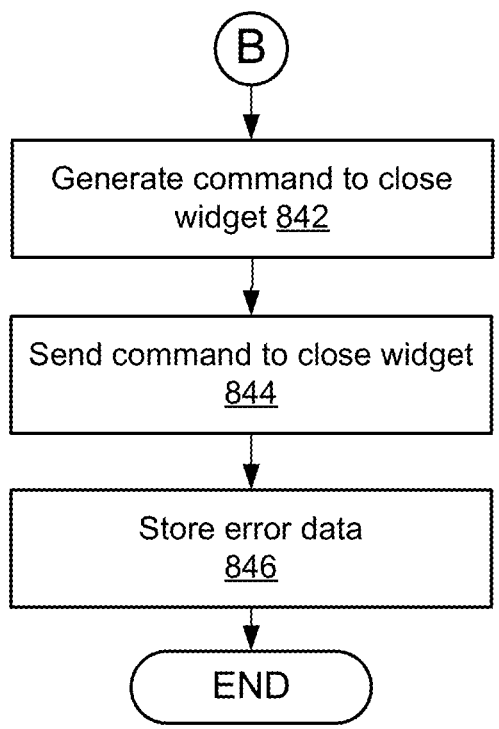
Figure 9:
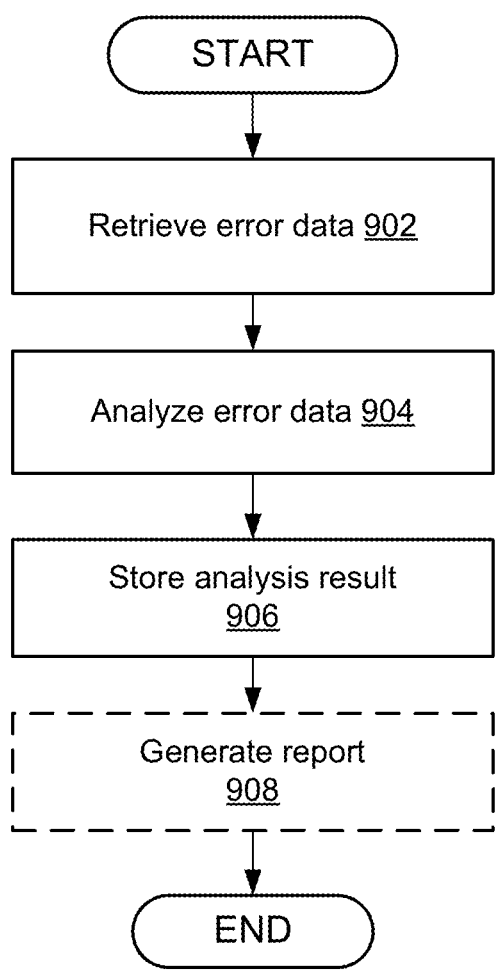
FIG. 9 is a flow diagram illustrating one embodiment of a method for analyzing error data associated with a widget.

Referring now to FIGS. 7-9, various embodiments of the method of the specification will be described. FIG. 7 is a flow diagram illustrating one embodiment of a method 700 for error handling associated with a widget hosted on a host page.

The initialization module 403 initializes the widget and generates a registration signal to register the widget. The initialization module 403 sends the registration signal to the registration module 203 and the registration module 203 registers 702 the widget in a registration file. The load module 404 begins to load the widget on the host page. The manager monitoring module 207 receives 704 a display-ready notification from the notification module 405 when the widget is loaded on the host page and ready to be displayed. Responsive to receiving the display-ready notification, the manager monitoring module 207 instructs the command module 205 to generate 706 a command for displaying the widget. The command module 205 sends 707 the command to notify the command execution module 411 to display the widget on the host page. The command execution module 411 displays the widget on the host page responsive to receiving the command.

The manager monitoring module 207 monitors 708 the widget to identify any activity associated with the displayed widget. In one embodiment, the manager monitoring module 207 cooperates with the widget monitoring module 407 to monitor activities associated with the widget. For example, the manager monitoring module 207 receives one or more of a heartbeat signal, interaction data and a status update including status data from the widget monitoring module 407. The manager monitoring module 207 sends the status data to the error detection engine 209.

The error detection engine 209 parses the status data and determines whether an error associated with the widget occurs. If the error detection engine 209 detects 710 an error, the error detection engine 209 performs 712 an error correction procedure responsive to the detection of the error. In one embodiment, the error detection engine 209 performs an error correction procedure when a predetermined number of errors (e.g., 10 errors) have been detected.

FIGS. 8A-8C are flow diagrams illustrating another embodiment of a method 800 for error handling associated with a widget hosted on a host page. Referring to FIG. 8A, the registration module 203 registers 802 the widget in a registration file responsive to receiving a registration signal from the initialization module 403. The manager monitoring module 207 performs 803 a health check of the widget. If the widget is healthy, the load module 404 begins to load the widget on the host page. The manager monitoring module 207 receives 804 a load notification from the notification module 405 indicating that the widget is starting to be loaded on the host page and begins to monitor 806 the loading of the widget on the host page. When the widget is successfully loaded on the host page, the manager monitoring module 207 receives 808 a display-ready notification from the notification module 405 indicating that the widget is ready to be displayed on the host page.

In one embodiment, the manager monitoring module 207 calculates a loading time for loading the widget on the host page. For example, the manager monitoring module 207 determines the loading time as a time interval between receiving the load notification and the display-ready notification. The manager monitoring module 207 determines 810 whether the loading time exceeds a predetermined amount of time. If the loading time exceeds the predetermined amount of time, the manager monitoring module 207 generates and sends a time-exceeding signal to the error detection engine 209 and the method 800 moves to block 811. Otherwise, the method 800 moves to block 818.

At block 811, the error detection engine 209 determines that a warning is detected responsive to receiving a time-exceeding signal. The warning timeout, when exceeded, allows the widget to possible load by the error timeout. In one embodiment, when the warning timeout is exceeded, the error detection engine 209 receives a signal of the occurrence or the warning is recorded for later conveyance to the error detection engine.

If the widget does not load, the error detection engine 209 determines 812 that an error is detected responsive to receiving a time-exceeding signal. The error detection engine 209 performs an error correction procedure in response to detecting an error. In one embodiment, the error detection engine 209 instructs the command module 205 to generate 814 a command (e.g., a "disable" command) to disable the widget. The command module 205 sends 816 the command to the command execution module 411. The command execution module 411 disables the widget responsive to receiving the command.

Turning to block 818, the manager monitoring module 207 instructs the command module 205 to generate a command (e.g., a "show" command) to display the widget on the host page. The command module 205 sends 820 the command to the command execution module 411. The command execution module 411 displays the widget on the host page responsive to receiving the command.

Referring now to FIG. 8B, the manager monitoring module 207 monitors 822 any activity associated with the widget. In one embodiment, the manager monitoring module 207 cooperates with the widget monitoring module 407 to monitor activities associated with the widget. In some embodiments, the monitoring occurs periodically on a timer. In another embodiment, the manager monitoring module 207 monitors the activity in response to a trigger, such as watching user activity via user interface events.

In some embodiments, the manager monitoring module 207 queries 823 about the widget health. For example, the manager monitoring module 207 pings or sends a beacon to a remote server to receive widget statistics that could indicate a problem with the widget. This is particularly useful for detecting problems before they become crippling to the system.

If a user interacts with the widget (e.g., clicking the widget, providing an input to the widget, etc.), the widget monitoring module 407 detects the user interaction and generates interaction data describing the user interaction. The widget monitoring module 407 receives 824 the interaction data from the manager monitoring module 207 and stores 826 the interaction data in the storage 105. Optionally, the manager monitoring module 207 receives 828 a heartbeat signal indicating that the widget is active from the widget monitoring module 407. The manager monitoring module 207 stores 830 the heartbeat signal as a portion of the status data 302 in the storage 105.

In one embodiment, the manager monitoring module 207 instructs the command module 205 to generate 832 a status update request to inquire about a status of the widget. The status update request includes one or more commands such as a "requestHealth" command and/or a "requestDiagnosticString" command. The command module 205 sends 834 the status update request to the command execution module 411. The command execution module 411 extracts the one or more commands from the status update request and instructs the widget monitoring module 407 to generate a status update including status data describing the status of the widget. The manager monitoring module 207 receives 836 the status update from the widget monitoring module 407. The manager monitoring module 207 extracts the status data from the status update and stores 838 the status data in the storage 105. In one embodiment, the manager monitoring module 207 sends the status data to the error detection module 209.

The error detection module 209 receives the status data from the manager monitoring module 207. In one embodiment, the error detection module 209 retrieves the status data from the storage 105. The error detection module 209 parses the status data and determines 840 whether an error is detected based at least in part on the status data. For example, the error detection engine 209 determines that an error occurs when the status data describes that the widget is in an unhealthy state. As another example, the error detection engine 209 determines that one or more errors occur if the value for the error count included in the status data is nonzero. In some embodiments, a user such as an administrator is notified of the error.

If an error is detected, the method 800 moves to block 846. Otherwise, the method 800 moves back to block 822. In one embodiment, the method 800 moves to block 842 only when a predetermined number of errors (e.g., 10 errors) have been detected by the error detection engine 209. Otherwise, the method 800 moves back to block 822 if the detected errors are less than the predetermined number of errors.

Referring to FIG. 8C, the error detection engine 209 performs an error correction procedure responsive to detecting one or more errors. In one embodiment, the error detection engine 209 performs the error correction procedure when the detected errors exceed a predetermined number of errors (e.g., 10 errors). The error detection engine 209 performs the error correction procedure by instructing the command module 205 to generate 842 a command to close the widget. The command module 205 sends 844 the command to the command execution module 411. The command execution module 411 removes the widget from the host page responsive to receiving the command. In one embodiment, the error detection engine 209 instructs the command module 205 to generate a command to disable the widget and the command is sent to the command execution module 411. The command execution module 411 disables the widget.

The error detection engine 209 stores 846 error data associated with the one or more detected errors. In one embodiment, the error data includes data identifying the type of errors, a brief description of the errors, an identifier of the widget and status data for the widget when the errors occur, etc.

FIG. 9 is a flow diagram illustrating one embodiment of a method 900 for analyzing error data associated with a widget. The data analysis module 219 retrieves 902 error data associated with a widget from the storage 105. The data analysis module 219 analyzes 904 the error data to generate an analysis result. For example, the data analysis module 219 employs machine learning techniques to generate an analysis result. In another example, the data analysis module 219 performs an error rate check. In one embodiment, the analysis result includes analytics data describing error patterns and factors incurring the errors. The data analysis module 219 stores 906 the analysis result as a portion of analytics data 305 in the storage 105. Optionally, the data analysis module 219 generates 908 a report including the analysis result to a user.

In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for error handling associated with widgets hosted on host pages the method comprising:
   registering, with one or more computing devices, a widget to be hosted on a host page;
   sending, with the one or more computing devices, a command to display the widget on the host page;
   monitoring, with the one or more computing devices, the displayed widget;
   determining, with the one or more computing devices, whether an error associated with the widget is detected, wherein the error includes an infinite redirect;
   applying a handler before creating an iframe;
   removing the handler when the iframe is successfully loaded in the host page; and
   responsive to detection of the error, performing, with the one or more computing devices, an error correction procedure to the widget.

2. The method of claim 1, wherein the error correction procedure includes one of closing the widget, disabling the widget, deactivating the widget and notifying a user of the error.

3. The method of claim 1, wherein monitoring the widget further comprises:
   receiving a heartbeat signal indicating that the widget is active from a user device.

4. The method of claim 1, wherein monitoring the widget further comprises:
   sending a status update request to a user device for inquiring about a status of the widget; and
   receiving a status update including status data describing the status of the widget from the user device.

5. The method of claim 1, wherein detecting the error further comprises:
   detecting the error based at least in part on status data describing a status of the widget.

6. The method of claim 1 further comprising:
   monitoring loading of the widget on the host page; and
   detecting a loading error if the widget fails to load on the host page.

7. The method of claim 1 further comprising:
   analyzing program code associated with the widget; and
   detecting a harmful code pattern in the program code.

8. The method of claim 1, wherein the error includes at least one of frame busting, infinite redirects, self-DoS, uncaught JavaScript errors and stealing focus from the host page.

9. The method of claim 1, further comprising establishing a common library for all widget frontends.

10. A computer program product comprising a non-transitory computer usable medium including a computer readable program, wherein the computer readable program when executed on a computer causes the computer to perform steps comprising:
    registering a widget to be hosted on a host page, wherein the host page is presented on a user device;
    receiving a notification indicating that the widget is ready to be displayed on the host page from the user device;
    sending a command to the user device for displaying the widget;
    monitoring the widget displayed on the host page;
    detecting an error associated with the widget, wherein the error is an infinite redirect;
    applying a handler before creating an iframe;
    removing the handler when the iframe is successfully loaded in the host page; and responsive to detection of the error, performing an error correction procedure to the widget.

11. The computer program product of claim 10, wherein the error correction procedure includes one of closing the widget, disabling the widget, deactivating the widget and notifying a user of the error.

12. The computer program product of claim 10, wherein the computer readable program when executed causes the computer to perform a further step comprising:
receiving a heartbeat signal indicating that the widget is active from the user device.

13. The computer program product of claim 10, wherein the computer readable program when executed causes the computer to perform further steps comprising:
sending a status update request to the user device for inquiring a status of the widget; and
receiving a status update including status data describing the status of the widget from the user device.

14. The computer program product of claim 10, wherein the computer readable program when executed causes the computer to perform a further step comprising:
detecting the error based at least in part on status data describing a status of the widget.

15. A system for error handling associated with a widget hosted on a host page comprising:
one or more processors configured to:
register a widget to be hosted on a host page, wherein the host page is presented on a user device;
send a command to display the widget on the host page;
monitor the displayed widget;
determine whether an error associated with the widget is detected, wherein the error is an infinite redirect;
apply a handler before creating an iframe;
remove the handler when the iframe is successfully loaded in the host page; and
responsive to detection of the error, perform an error correction procedure to the widget.

16. The system of claim 15, wherein the error correction procedure includes one of closing the widget, disabling the widget, deactivating the widget and notifying a user of the error.

17. The system of claim 15 is further configured to:
receive a heartbeat signal indicating that the widget is active from the user device and send the heartbeat signal to a manager monitoring module.

18. The system of claim 15 further configured to:
send a status update request to the user device for inquiring a status of the widget, wherein the status update request is generated by a command module; and
receive a status update including status data describing the status of the widget from the user device and send the status update to a manager monitoring module.

19. The system of claim 15, wherein the error detection engine is further configured to:
detect the error based at least in part on status data describing a status of the widget.

20. The method of claim 1, wherein performing, with the one or more computing devices, an error correction procedure to the widget is done only after a predetermined number of errors have occurred.

* * * * *